(12) United States Patent
Cruz et al.

(10) Patent No.: US 9,951,156 B2
(45) Date of Patent: Apr. 24, 2018

(54) TITANIUM PHOSPHINIMIDE AND TITANIUM IMINOIMIDAZOLIDIDE CATALYST SYSTEMS WITH ACTIVATOR-SUPPORTS

(71) Applicant: Chevron Phillips Chemical Company LP, The Woodlands, TX (US)

(72) Inventors: Carlos A. Cruz, Bartlesville, OK (US); Jared L. Barr, Bartlesville, OK (US); Jeremy M. Praetorius, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 15/225,902

(22) Filed: Aug. 2, 2016

(65) Prior Publication Data

US 2016/0340450 A1    Nov. 24, 2016

Related U.S. Application Data

(62) Division of application No. 14/510,153, filed on Oct. 9, 2014, now Pat. No. 9,441,063.

(51) Int. Cl.
| | |
|---|---|
| C08F 4/6592 | (2006.01) |
| C08F 210/02 | (2006.01) |
| C08F 210/16 | (2006.01) |
| C08F 10/02 | (2006.01) |
| C08F 4/659 | (2006.01) |

(52) U.S. Cl.
CPC ............ *C08F 10/02* (2013.01); *C08F 4/6592* (2013.01); *C08F 210/16* (2013.01); *C08F 4/65912* (2013.01); *C08F 4/65916* (2013.01); *C08F 4/65925* (2013.01); *C08F 4/65927* (2013.01); *C08F 2420/04* (2013.01); *C08F 2420/05* (2013.01); *C08F 2500/04* (2013.01); *C08F 2500/08* (2013.01); *C08F 2500/09* (2013.01); *C08F 2500/10* (2013.01); *C08F 2500/12* (2013.01)

(58) Field of Classification Search
CPC ..... C08F 4/6592; C08F 210/02; C08F 210/16
See application file for complete search history.

(56) References Cited

U.S. PATENT DOCUMENTS

| | | | |
|---|---|---|---|
| 3,242,099 A | 3/1966 | Manyik | |
| 3,248,179 A | 4/1966 | Norwood | |
| 4,501,885 A | 2/1985 | Sherk | |
| 4,588,790 A | 5/1986 | Jenkins | |
| 4,794,096 A | 12/1988 | Ewen | |
| 4,808,561 A | 2/1989 | Welborn | |
| 5,352,749 A | 10/1994 | DeChellis | |
| 5,436,304 A | 7/1995 | Griffin | |
| 5,455,314 A | 10/1995 | Burns | |
| 5,565,175 A | 10/1996 | Hottovy | |
| 5,575,979 A | 11/1996 | Hanson | |
| 5,576,259 A | 11/1996 | Hasegawa | |
| 5,739,220 A | 4/1998 | Shamshoum et al. | |
| 5,807,938 A | 9/1998 | Kaneko | |
| 5,919,983 A | 7/1999 | Rosen | |
| 6,107,230 A | 8/2000 | McDaniel | |
| 6,165,929 A | 12/2000 | McDaniel | |
| 6,239,235 B1 | 5/2001 | Hottovy | |
| 6,262,191 B1 | 7/2001 | Hottovy | |
| 6,294,494 B1 | 9/2001 | McDaniel | |
| 6,300,271 B1 | 10/2001 | McDaniel | |
| 6,316,553 B1 | 11/2001 | McDaniel | |
| 6,355,594 B1 | 3/2002 | McDaniel | |
| 6,372,864 B1 | 4/2002 | Brown | |
| 6,376,415 B1 | 4/2002 | McDaniel | |
| 6,388,017 B1 | 5/2002 | McDaniel | |
| 6,391,816 B1 | 5/2002 | McDaniel | |
| 6,395,666 B1 | 5/2002 | McDaniel | |
| 6,440,890 B1 | 8/2002 | Von Haken Spence et al. | |
| 6,524,987 B1 | 2/2003 | Collins | |
| 6,548,441 B1 | 4/2003 | McDaniel | |
| 6,548,442 B1 | 4/2003 | McDaniel | |
| 6,576,583 B1 | 6/2003 | McDaniel | |
| 6,613,712 B1 | 9/2003 | McDaniel | |
| 6,632,894 B1 | 10/2003 | McDaniel | |
| 6,667,274 B1 | 12/2003 | Hawley | |
| 6,710,143 B2 | 3/2004 | Gao et al. | |
| 6,734,266 B2 | 5/2004 | Gao et al. | |
| 6,750,302 B1 | 6/2004 | McDaniel | |
| 6,777,509 B2 | 8/2004 | Brown et al. | |
| 6,833,415 B2 | 12/2004 | Kendrick | |
| 6,858,558 B2 * | 2/2005 | Kretschmer | C07F 17/00 502/103 |

(Continued)

FOREIGN PATENT DOCUMENTS

WO    WO 2013/026131    2/2013

OTHER PUBLICATIONS

Alhomaidan et al., entitled "Hafnium-Phosphinimide Complexes," published in Can. J. Chem (2009) vol. 87, pp. 1163-1172.
Alhomaidan et al., entitled "Main Group Heterocycles from Lithiated Phosphinimines," published in Organometallics (2007) vol. 26, No. 12, pp. 3041-3048.
Alhomaidan et al., entitled "Titanium Complexes of Amidophosphinimide Ligands†," published in Dalton Trans. (2009) pp. 1991-1998.
Alhomaidan et al., entitled "Use of Olefin Metathesis to Link Phosphinimide-Cyclopentadienyl Ligand Complexes: Synthesis, Structure, and Ethylene Polymerization Activity," published in Organometallics (2008) vol. 27, No. 23, pp. 6343-6352.
Arnett et al., entitled "Zero-Shear Viscosity of Some Ethyl Branched paraffinic Model Polymers," J. Phys. Chem. (1980) vol. 84, No. 6, pp. 649-652.
Beddie et al., entitled "Titanium Pyridyl-Phosphinimide Complexes—Synthesis, Structure, and Ethylene Polymerization Catalysis," published in Can J. Chem. (2006) vol. 84, pp. 755-761.

(Continued)

*Primary Examiner* — Caixia Lu
(74) *Attorney, Agent, or Firm* — Merchant & Gould P.C.

(57) ABSTRACT

Catalyst compositions containing activator-supports and half-metallocene titanium phosphinimide complexes or half-metallocene titanium iminoimidazolidide complexes are disclosed. These catalyst compositions can be used to produce olefin polymers having relatively broad molecular weight distributions and low levels of long chain branching.

22 Claims, 6 Drawing Sheets

(56) References Cited

U.S. PATENT DOCUMENTS

| | | |
|---|---|---|
| 6,984,695 B2 | 1/2006 | Brown et al. |
| 7,026,494 B1 | 4/2006 | Yang et al. |
| 7,041,617 B2 | 5/2006 | Jensen et al. |
| 7,078,469 B2 | 7/2006 | Hoang et al. |
| 7,199,073 B2 | 4/2007 | Martin et al. |
| 7,226,886 B2 | 6/2007 | Jayaratne |
| 7,294,599 B2 | 11/2007 | Jensen et al. |
| 7,312,283 B2 | 12/2007 | Martin et al. |
| 7,517,939 B2 | 4/2009 | Yang |
| 7,534,842 B2 | 5/2009 | Jayaratne et al. |
| 7,601,665 B2 | 10/2009 | McDaniel et al. |
| 7,619,047 B2 | 11/2009 | Yang et al. |
| 7,650,930 B2 | 1/2010 | Cheluget et al. |
| 7,884,163 B2 | 2/2011 | McDaniel et al. |
| 7,919,639 B2 | 4/2011 | Murray et al. |
| 8,080,681 B2 | 12/2011 | Murray et al. |
| 8,114,946 B2 | 2/2012 | Yang et al. |
| 8,309,485 B2 | 11/2012 | Yang et al. |
| 8,383,754 B2 | 2/2013 | Yang et al. |
| 8,431,096 B2 | 4/2013 | Cheluget et al. |
| 8,431,657 B2 | 4/2013 | Wang et al. |
| 8,623,973 B1 | 1/2014 | McDaniel et al. |
| 8,680,218 B1 | 3/2014 | Yang et al. |
| 8,703,886 B1 | 4/2014 | Yang et al. |
| 9,079,991 B2 | 7/2015 | Ker et al. |
| 9,441,063 B2 | 9/2016 | Cruz et al. |
| 2003/0092563 A1 | 5/2003 | Gao et al. |
| 2004/0059070 A1 | 3/2004 | Whitte et al. |
| 2006/0205900 A1* | 9/2006 | Windmuller .......... C08F 210/18 526/160 |
| 2012/0259080 A1 | 10/2012 | Henderson et al. |
| 2012/0316297 A1 | 12/2012 | Hoang et al. |

OTHER PUBLICATIONS

Beddie et al., entitled "*Use of Computational and Synthetic Chemistry in Catalyst Design: A New Family of High Activity Ethylene Polymerization Catalysts Based on Titanium Tris(amino)phosphinimide Complexes,*" published in Organometallics (2004) vol. 23, No. 22, pp. 5240-5251.

Cabrera et al., entitled "*Cationic Methyl- and Chlorotitanium Phosphinimide Complexes,*" published in Organometallics (2005) vol. 24, No. 6, pp. 1091-1098.

Camacho-Bunquin et al., entitled "*Hydrocarbon-Soluble Nanocatalysts with No Bulk Phase: Coplanar, Two-Coordinate Arrays of the Base Metals,*" published in J. Am. Chem. (2013) vol. 135, pp. 5537-5540.

Carraz et al., entitled "*Titanium Complexes of Sterically Demanding Cage-Phosphinimide Ligands,*" published in Organometallics (2000) vol. 19, No. 19, pp. 3791-3796.

Cornelissen, et al., entitled "*Chemistry of Metal-Metal-Bonded Early-Late Heterobimetallics: Cooperative Reactions of Functional Groups at a Persistent Organometallic Zr—Rh Framework,*" published in Organometallics (2005) vol. 24, No. 2, pp. 214-225.

Courtenay et al., entitled "*Boron and Aluminum Complexes of Sterically Demanding Phosphinimines and Phosphinimides,*" published in Inorg. Chem. (2007) vol. 46, No. 9, pp. 3623-3631.

Courtenay et al., entitled "*Phosphinimido Complexes of Silicon, Tin, and Germanium,*" published in Organometallics (2003) vol. 22, No. 4, pp. 818-825.

Courtenay et al., entitled "*Synthesis and Reactivity of Neutral, Zwitterionic and Pentamethylcyclopentadienyl-Tantalum-Phosphinimide Complexes,*" published in Organometallics (2001) vol. 20, No. 7, pp. 1442-1450.

Courtenay et al., entitled "*The Syntheses and Structures of Lithium Phosphinimide and Phosphinimine Complexes,*" published in Can. J. Chem (2003) vol. 81, pp. 1471-1476.

Dehnicke et al., entitled "*Phosphorane Iminato Complexes of Main Group Elements,*" published in Coordination Chemistry Reviews (1997) vol. 158, pp. 103-169.

*Film Extrusion Manual—Process, Materials, Properties*, TAPPI Press (1992), 16 pages.

Friesen et al., entitled "*Selective Catalytic Dimerization of Neohexene by [CP\*Ti(NP$^t$Bu$_3$)Me][B(C$_6$F$_5$)$_4$],*" published in Organometallics (2008) vol. 27, No. 24, pp. 6596-6604.

Ghesner et al., entitled "*Di-tert-butylbiphenylphosphinimide Titanium and Zirconium Complexes: Pendant Arene-Metal Interactions,*" published in Organometallics (2006) vol. 25, No. 21, pp. 4985-4995.

Graham et al., entitled "*Reduction of Titanium(IV)-Phosphinimide Complexes: Routes to Ti(III) Dimers, Ti(IV)-Metallacycles, and Ti(II) Species,*" published in Organometallics (2004) vol. 23, No. 13, pp. 3309-3318.

Guérin et al., entitled "*Synthesis, Structure, and Reactivity of the Phosphinimide Complexes $(t$-$Bu_3PN)_nMX_{4-n}$ $(M$=$Ti, Zr)$,*" published in Organometallics (2000) vol. 19, No. 16, pp. 2994-3000.

Hawkeswood et al., entitled "*Steric Effects in Metathesis and Reduction Reactions of Phosphinimines With Catechol- and Pinacolboranes,*" published in Inorg. Chem. (2005) vol. 44, No. 12, pp. 4301-4308.

Hawkeswood et al., entitled "*Synthesis and Characterization of Vanadium(V)-Phosphinimide Complexes,*" published in Inorg. Chem. (2003) vol. 42, No. 17, pp. 5429-5433.

Hieber et al., entitled "*Shear-Rate-Dependence Modeling of Polymer Melt Viscosity,*" Polym. Eng. Sci. (1992) vol. 32, pp. 931-938.

Hieber et al., entitled "*Some Correlations Involving the Sear Viscosity of Polystyrene Melts,*" Rheol. Acta, 28 (1989) pp. 321-332.

Hollink et al., entitled "*Altering Molecular Weight Distributions: Benzyl-Phosphinimide Titanium Complexes as Ethylene Polymerization Catalysts,*" published in Can. J. Chem. (2004) vol. 87, pp. 1304-1313.

Hollink et al., entitled "*Group IV Phosphinimide Amide Complexes,*" published in Can. J. Chem. (2004) vol. 82, pp. 1634-1639.

Hollink et al., entitled "*The Effects of Activators on Zirconium Phosphinimide Ethylene Polymerization Catalysts,*" published in Organometallics (2004) vol. 23, No. 7, pp. 1562-1569.

Hollink et al., entitled "*Ti and Zr Bidentate bis-Phiosphinimide Complexes,*" published in Dalton Trans. (2003) pp. 3968-3974.

International Application PCT/US2015/052873 Search Report dated Apr. 25, 2016, 6 pages.

Janzen et al., entitled "*Diagnosing Long-Chain Branching in Polyethylenes,*" J. Mol. Struct., pp. 485-486, 569-584 (1999), 20 pages.

Kickham et al., entitled "*Divergent Pathways of C—H Bond Activation: Reactions of $(t$-$Bu_3PN)_2$ $TiMe_2$ with Trimethylaluminum,*" published in J. Am. Chem. Soc. (2002) vol. 124, No. 38, pp. 11486-11494.

Kickham et al., entitled "*Multiple C—H Bond Activation: Reactions of Titanium-Phosphinimide Complexes with Trimethylaluminum,*" published in Organometallics (2001) vol. 20, No. 6, pp. 1175-1182.

LePichon et al., entitled "*Contrasting Formation of a (Phenylthio)phosphinimine and (Phenylthio)phosphazide. Synthesis of Metal Complexes,*" published in Inorg. Chem. (2001) vol. 40, No. 15, pp. 3827-3829.

LePichon et al., entitled "*Iron Phosphinimide and Phosphinimine Complexes: Catalyst Precursors for Ethylene Polymerization,*" published in Organometallics (2002) vol. 21, No. 7, pp. 1362-1366.

Ma et al., entitled "*Competitive ArC—H and ArC—X (X=CI, Br) Activation in Halobenzenes at Cationic Titanium Centers,*" published in J. Am. Chem. Soc. (2006) vol. 128, No. 10, pp. 3303-3312.

Ma et al., entitled "*Isolation and Characterization of a Monomeric Cationic Titanium Hydride,*" published in J. Am. Chem. Soc. (2004) vol. 126, No. 18, pp. 5668-5669.

Martinez et al., entitled "*Monometallic, Homo-, and Hetero-Bimetallic Complexes of a Siloxy-bis(Phosphinimide) Ligand,*" published in Can. J. Chem. (2006) vol. 84 pp. 1180-1187.

McCahill et al., entitled "*Copolymerization of Sterically Demanding Phosphine-Olefins and 1-Hexene,*" published in Can. J. Chem. (2009) vol. 87, pp. 1620-1624.

*Modern Plastics Encyclopedia*, Mid-Nov. 1995 Issue, vol. 72, No. 12, 3 pages.

Ong et al., entitled "*Neutral and Cationic Group 13 Phosphinimine and Phosphinimide Complexes,*" published in Organometallics (1999) vol. 18, No. 20, pp. 4197-4204.

(56) References Cited

OTHER PUBLICATIONS

Ong et al., entitled "*Synthesis, Structure, and Reactivity of Titanium Phosphinimide Thiolate Complexes,*" published in Organometallics (2002) vol. 21, No. 8, pp. 1646-1653.

Qi et al., entitled "*Titanium Complexes with Novel Triaryl-Substituted Phosphinimide Ligands: Synthesis, Structure and Ethylene Polymerization Behavior,*" published in J. of Organometallic Chemistry (2006) vol. 691, pp. 1154-1158.

R. B. Bird et al., entitled "*Dynamics of Polymeric Liquids,*" Fluid Mechanics, 2nd Edition, John Wiley & Sons (1987) vol. 1, 3 pages.

Ramos et al., entitled "*Titanium Ferrocenyl-Phosphinimide Complexes,*" published in Dalton Trans. (2010) vol. 39, pp. 1328-1338.

Schwerdtfeger et al, entitled "*Controlling long-chain branch formation in polyethylene,*" Current Topics in Catalysis (2016) vol. 12, 27 pages.

Stephan, Douglas W., entitled "*The Road to Early-Transition-Metal Phosphinimide Olefin Polymerization Catalysts,*" published in Organometallics (2005) vol. 24, No. 11, pp. 2548-2560.

Stephan et al., entitled "*An Approach to Catalyst Design: Cyclopentadienyl-Titanium Phosphinimide Complexes in Ethylene Polymerization,*" published in Organometallics (2003) vol. 22, No. 9, pp. 1937-1947.

Stephan et al., entitled "*Phosphinimides as a Steric Equivalent to Cyclopentadienyl: An Approach to Ethylene Polymerization Catalyst Design,*" published in Organometallics (1999) vol. 18, No. 7, pp. 1116-1118.

Stephan et al., entitled "*Remarkably Active Non-Metallocene Ethylene Polymerization Catalysts,*" published in Organometallics (1999) vol. 18, pp. 2046-2048.

Sung et al., entitled "*Synthesis, Structure, and Single-Crystal EPR Study of $[Cp(t-Bu_3PN)Ti(\mu-Cl)]_2$,*" published in Inorg. Chem. (2000) vol. 39, No. 12, pp. 2542-2546.

Voth et al., entitled "*Functionalizing Titanium-Phosphinimide Complexes,*" published in Organometallics (2006) vol. 25, No. 20, pp. 4779-4786.

Wei et al., entitled "*Magnesium Complexes of Bis(phosphinimine)Methane and -Methanide Ligands,*" published in Organometallics (2003) vol. 22, No. 3, pp. 601-604.

Wyatt, Philip J., entitled "*Light Scattering and the Absolute Characterization of Macromolecules,*" Analytica Chimica Acta (1993) vol. 272, pp. 1-40.

Yadav et al., entitled "*Phosphinimide Complexes With Pendant Hemilabile Donors: Synthesis, Structure and Ethylene Polymerization Activity†,*" published in Dalton Trans. (2009) pp. 1636-1643.

Yu et al. entitled "*Long Chain Branches in Metallocene-Catalyzed Polyethylene Determined by a Combination of SEC/Multi-Angle Light Scattering, NMR and Rheology,*" Polymer Preprint (2003), 2 pages.

Yue et al., entitled "*Phosphinimide-Phosphinimide Ligands: New Bulky Ligands for Ethylene Polymerization Catalysts,*" published in Organometallics (2001) vol. 20, No. 11, pp. 2303-2308.

Yue et al., entitled "*Zirconium Phosphinimide Complexes: Synthesis, Structure, and Deactivation Pathways in Ethylene Polymerization Catalysis,*" published in Organometallics (2001) vol. 20, pp. 4424-4433.

U.S. Appl. No. 15/481,502, filed Apr. 7, 2017 entitled "Catalyst Systems Containing Low Valent Titanium Compounds and Polymers Produced Therefrom."

Gupta et al., entitled "*Does the length of the short chain branch affected the mechanical properties of linear low density polyethylenes? An investigation based on films of copolymers of ethylene/1-butene, ethylene/1-hexene and ethylene/1-octene synthesized by a single site metallocene catalyst,*" Polymer, vol. 46, (2005) pp. 8819-8837.

\* cited by examiner

TITANIUM PHOSPHINIMIDE AND TITANIUM IMINOIMIDAZOLIDIDE CATALYST SYSTEMS WITH ACTIVATOR-SUPPORTS

CROSS-REFERENCE TO RELATED APPLICATION

This application is a divisional application of U.S. patent application Ser. No. 14/510,153, filed on Oct. 9, 2014, now U.S. Pat. No. 9,441,063, the disclosure of which is incorporated herein by reference in its entirety.

BACKGROUND OF THE INVENTION

Polyolefins such as high density polyethylene (HDPE) homopolymer and linear low density polyethylene (LLDPE) copolymer can be produced using various combinations of catalyst systems and polymerization processes. Traditional Ziegler catalyst systems can produce olefin polymers having, for example, good extrusion processibility and polymer melt strength, typically due to their broad molecular weight distribution (MWD). In some end-use applications, it can be beneficial for the olefin polymer also to have low levels of long chain branching. Moreover, it can be beneficial for the catalyst system employed to efficiently incorporate comonomer, as well as to have a greater sensitivity to hydrogen to enable a broader range of polymer melt index and molecular weight to be produced. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Generally, the present invention is directed to half-metallocene titanium compounds, catalyst compositions containing these half-metallocene titanium compounds, methods for preparing the catalyst compositions, methods for using the catalyst compositions to polymerize olefins, the polymer resins produced using such catalyst compositions, and articles produced using these polymer resins.

According to one aspect of the invention, the half-metallocene titanium compound can have the structure of formula (II):

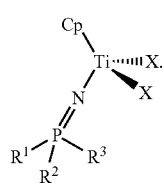

(II)

According to another aspect of the invention, the half-metallocene titanium compound can have the structure of formula (III):

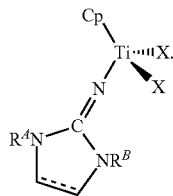

(III)

In these formulas, each Cp independently can be any cyclopentadienyl, indenyl, or fluorenyl group disclosed herein, and each X independently can be any monoanionic ligand disclosed herein. Independently, $R^1$, $R^2$, $R^3$, $R^4$, and $R^B$ can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein.

Other aspects of the present invention are directed to catalyst compositions containing any half-metallocene titanium compound disclosed herein, any activator-support disclosed herein, and optionally, any co-catalyst disclosed herein. Such catalyst compositions can be used to produce, for example, ethylene-based homopolymers and copolymers for variety of end-use applications.

The present invention also contemplates and encompasses olefin polymerization processes. Such processes can comprise contacting a catalyst composition with an olefin monomer and optionally an olefin comonomer under polymerization conditions to produce an olefin polymer. Generally, the catalyst composition employed can comprise any of the half-metallocene titanium compounds and any of the activator-supports and optional co-catalysts disclosed herein. For example, organoaluminum compounds can be utilized in the catalyst compositions and/or polymerization processes.

Polymers produced from the polymerization of olefins, resulting in homopolymers, copolymers, terpolymers, etc., can be used to produce various articles of manufacture. A representative and non-limiting example of an olefin polymer (e.g., an ethylene homopolymer or copolymer) consistent with aspects of this invention can be characterized by the following properties: a ratio of Mw/Mn in a range from about 4 to about 10 (or from about 5 to about 9), a ratio of HLMI/MI in a range from about 15 to about 75 (or from about 25 to about 55), a density in a range from about 0.89 to about 0.97 g/cm³ (or from about 0.92 to about 0.94 g/cm³), less than or equal to about 0.008 long chain branches (LCB) per 1000 total carbon atoms (or less than or equal to about 0.003 LCB), and a conventional comonomer distribution (e.g., the number of short chain branches (SCB) per 1000 total carbon atoms of the polymer at Mn is greater than at Mz).

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
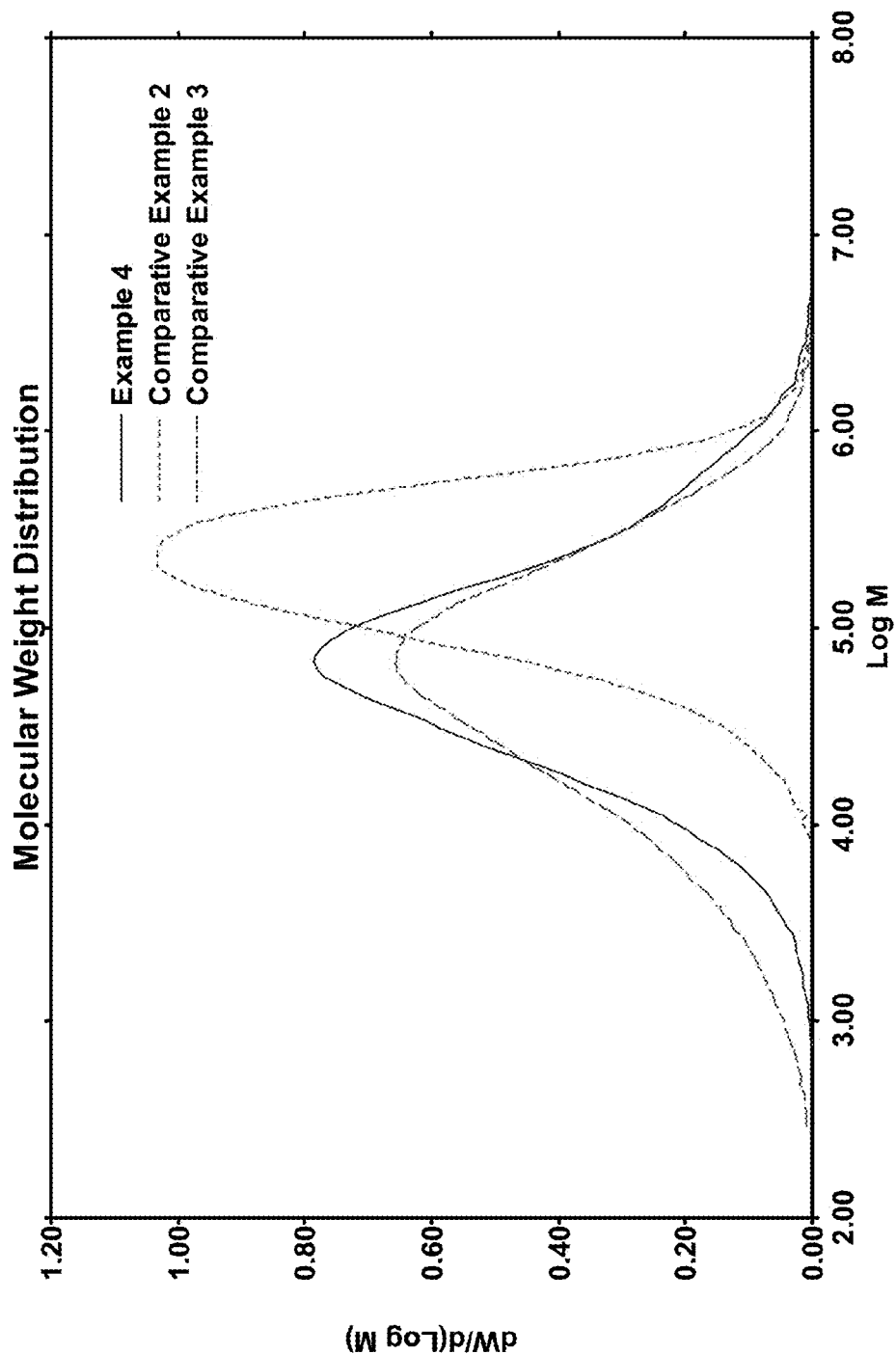
FIG. 1 presents a plot of the molecular weight distributions of polymers produced using a catalyst system containing a half-metallocene titanium compound (Example 4), produced using a standard metallocene-based catalyst system (Example C2), and produced using a standard Ziegler catalyst system (Example C3).

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described herein in terms of "comprising" various components or steps, the compositions and methods can also "consist essentially of" or "consist of" the various components or steps, unless stated otherwise. For example, a catalyst composition consistent with aspects of the present invention can comprise; alternatively, can consist essentially of; or alternatively, can consist of; (i) a half-metallocene titanium compound, (ii) an activator-support, and (iii) optionally, a co-catalyst.

The terms "a," "an," "the," etc., are intended to include plural alternatives, e.g., at least one, unless otherwise specified. For instance, the disclosure of "an activator-support" or "a half-metallocene titanium compound" is meant to encompass one, or mixtures or combinations of more than one, activator-support or half-metallocene titanium compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer.

In like manner, the scope of the term "polymerization" includes homopolymerization, copolymerization, terpolymerization, etc. Therefore, a copolymerization process can involve contacting one olefin monomer (e.g., ethylene) and one olefin comonomer (e.g., 1-hexene) to produce a copolymer.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the half-metallocene titanium compound, or the activator-support, after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time. For example, the components can be contacted by blending or mixing. Further, contacting of any component can occur in the presence or absence of any other component. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise contacted in some other manner. Therefore, the term "contacting" encompasses the "reacting" of two or more components, and it also encompasses the "mixing" or "blending" of two or more components that do not react with one another.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of an olefin polymer produced in an aspect of this invention. By a disclosure that the Mw/Mn can be in a range from about 4 to about 10, Applicants intend to recite that the Mw/Mn can be any ratio in the range and, for example, can be equal to about 4, about 5, about 6, about 7, about 8, about 9, or about 10. Additionally, the Mw/Mn can be within any range from about 4 to about 10 (for example, from about 5 to about 9), and this also includes any combination of ranges between about 4 and about 10 (for example, the Mw/Mn can be in a range from about 4 to about 6, or from about 7 to about 9). Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

The present invention is directed generally to new catalyst compositions, methods for preparing the catalyst compositions, methods for using the catalyst compositions to polymerize olefins, the polymer resins produced using such catalyst compositions, and articles produced using these polymer resins. In particular, the present invention relates to half-metallocene titanium phosphinimide complexes and half-metallocene titanium iminoimidazolidide complexes, to catalyst compositions employing these half-metallocene titanium complexes, to polymerization processes utilizing such catalyst compositions, and to the resulting olefin polymers produced from the polymerization processes.

Titanium Phosphinimides and Titanium Iminoimidazolidides

In an aspect of this invention, the half-metallocene titanium compounds can have the formula:

(I)

Within formula (I), Cp, L, and each X are independent elements of the half-metallocene titanium compound. Accordingly, the half-metallocene titanium compound having formula (I) may be described using any combination of Cp, L, and X disclosed herein.

Unless otherwise specified, formula (I) above, any other structural formulas disclosed herein, and any metallocene complex, compound, or species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

Each X in formula (I) independently can be a monoanionic ligand. In some aspects, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, —$OBR^X_2$, or —$OSO_2R^X$, wherein $R^X$ is a $C_1$ to $C_{36}$ hydrocarbyl group. It is contemplated that each X can be either the same or a different monoanionic ligand.

In one aspect, each X independently can be H, $BH_4$, a halide (e.g., F, Cl, Br, etc.), a $C_1$ to $C_{18}$ hydrocarbyl group, a $C_1$ to $C_{18}$ hydrocarboxy group, a $C_1$ to $C_{18}$ hydrocarbylaminyl group, a $C_1$ to $C_{18}$ hydrocarbylsilyl group, or a $C_1$ to $C_{18}$ hydrocarbylaminylsilyl group. Alternatively, each X independently can be H, $BH_4$, a halide, $OBR^X_2$, or $OSO_2R^X$, wherein $R^X$ is a $C_1$ to $C_{18}$ hydrocarbyl group. In another aspect, each X independently can be H, $BH_4$, a halide, a $C_1$ to $C_{12}$ hydrocarbyl group, a $C_1$ to $C_{12}$ hydrocarboxy group, a $C_1$ to $C_{12}$ hydrocarbylaminyl group, a $C_1$ to $C_{12}$ hydrocarbylsilyl group, a $C_1$ to $C_{12}$ hydrocarbylaminylsilyl group, $OBR^X_2$, or $OSO_2R^X$, wherein $R^X$ is a $C_1$ to $C_{12}$ hydrocarbyl group. In another aspect, each X independently can be H, $BH_4$, a halide, a $C_1$ to $C_{10}$ hydrocarbyl group, a $C_1$ to $C_{10}$ hydrocarboxy group, a $C_1$ to $C_{10}$ hydrocarbylaminyl group, a $C_1$ to $C_{10}$ hydrocarbylsilyl group, a $C_1$ to $C_{10}$ hydrocarbylaminylsilyl group, $OBR^X_2$, or $OSO_2R^X$, wherein $R^X$ is a $C_1$ to $C_{10}$ hydrocarbyl group. In yet another aspect, each X independently can be H, $BH_4$, a halide, a $C_1$ to $C_8$ hydrocarbyl group, a $C_1$ to $C_8$ hydrocarboxy group, a $C_1$ to $C_8$ hydrocarbylaminyl group, a $C_1$ to $C_8$ hydrocarbylsilyl group, a $C_1$ to $C_8$ hydrocarbylaminylsilyl group, $OBR^X_2$, or $OSO_2R^X$, wherein $R^X$ is a $C_1$ to $C_8$ hydrocarbyl group. In still another aspect, each X independently can be a halide or a $C_1$ to $C_{18}$ hydrocarbyl group. For example, both X's can be Cl.

The hydrocarbyl group which can be an X (one or both) in formula (I) can be a $C_1$ to $C_{36}$ hydrocarbyl group, including, but not limited to, a $C_1$ to $C_{36}$ alkyl group, a $C_2$ to $C_{36}$ alkenyl group, a $C_4$ to $C_{36}$ cycloalkyl group, a $C_6$ to $C_{36}$ aryl group, or a $C_7$ to $C_{36}$ aralkyl group. For instance, each X independently can be a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, each X independently can be a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; alternatively, each X independently can be a $C_1$ to $C_{10}$ alkyl group, a $C_2$ to $C_{10}$ alkenyl group, a $C_4$ to $C_{10}$ cycloalkyl group, a $C_6$ to $C_{10}$ aryl group, or a $C_7$ to $C_{10}$ aralkyl group; or alternatively, each X independently can be a $C_1$ to $C_5$ alkyl group, a $C_2$ to $C_5$ alkenyl group, a $C_5$ to $C_8$ cycloalkyl group, a $C_6$ to $C_8$ aryl group, or a $C_7$ to $C_8$ aralkyl group.

Accordingly, in some aspects, the alkyl group which can be an X in formula (I) can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In some aspects, the alkyl group which can be an X in formula (I) can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group; alternatively, a methyl group, an ethyl group, an iso-propyl group, a tert-butyl group, or a neopentyl group; alternatively, a methyl group; alternatively, an ethyl group; alternatively, a n-propyl group; alternatively, an iso-propyl group; alternatively, a tert-butyl group; or alternatively, a neopentyl group.

Suitable alkenyl groups which can be an X in formula (I) can include, but are not limited to, an ethenyl group, a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, or an octadecenyl group. Such alkenyl groups can be linear or branched, and the double bond can be located anywhere in the chain. In one aspect, each X in formula (I) independently can be an ethenyl group, a propenyl group, a butenyl group, a pentenyl group, a hexenyl group, a heptenyl group, an octenyl group, a nonenyl group, or a decenyl group, while in another aspect, each X in formula (I) independently can be an ethenyl group, a propenyl group, a butenyl group, a pentenyl group, or a hexenyl group. For example, an X can be an ethenyl group; alternatively, a propenyl group; alternatively, a butenyl group; alternatively, a pentenyl group; or alternatively, a hexenyl group. In yet another aspect, an X can be a terminal alkenyl group, such as a $C_3$ to $C_{18}$ terminal alkenyl group, a $C_3$ to $C_{12}$ terminal alkenyl group, or a $C_3$ to $C_8$ terminal alkenyl group. Illustrative terminal alkenyl groups can include, but are not limited to, a prop-2-en-1-yl group, a bute-3-en-1-yl group, a pent-4-en-1-yl group, a hex-5-en-1-yl group, a hept-6-en-1-yl group, an octe-7-en-1-yl group, a non-8-en-1-yl group, a dece-9-en-1-yl group, and so forth.

Each X in formula (I) independently can be a cycloalkyl group, including, but not limited to, a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, or a substituted cyclooctyl group. For example, an X in formula (I) can be a cyclopentyl group, a substituted cyclopentyl group, a cyclohexyl group, or a substituted cyclohexyl group. Moreover, each X in formula (I) independently can be a cyclobutyl group or a substituted cyclobutyl group; alternatively, a cyclopentyl group or a substituted cyclopentyl group; alternatively, a cyclohexyl group or a substituted cyclohexyl group; alternatively, a cycloheptyl group or a substituted cycloheptyl group; alternatively, a cyclooctyl group or a substituted cyclooctyl group; alternatively, a cyclopentyl group; alternatively, a substituted cyclopentyl group; alternatively, a cyclohexyl group; or alternatively, a substituted cyclohexyl group. Substituents which can be utilized for the substituted cycloalkyl group are independently disclosed herein and can be utilized without limitation to further describe the substituted cycloalkyl group which can be an X in formula (I).

In some aspects, the aryl group which can be an X in formula (I) can be a phenyl group, a substituted phenyl group, a naphthyl group, or a substituted naphthyl group. In an aspect, the aryl group can be a phenyl group or a substituted phenyl group; alternatively, a naphthyl group or a substituted naphthyl group; alternatively, a phenyl group or a naphthyl group; alternatively, a substituted phenyl group or a substituted naphthyl group; alternatively, a phenyl group; or alternatively, a naphthyl group. Substituents which can be utilized for the substituted phenyl groups or substituted naphthyl groups are independently disclosed herein and can be utilized without limitation to further describe the substituted phenyl groups or substituted naphthyl groups which can be an X in formula (I).

In an aspect, the substituted phenyl group which can be an X in formula (I) can be a 2-substituted phenyl group, a 3-substituted phenyl group, a 4-substituted phenyl group, a 2,4-disubstituted phenyl group, a 2,6-disubstituted phenyl group, a 3,5-disubstituted phenyl group, or a 2,4,6-trisubstituted phenyl group. In other aspects, the substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, a 3,5-disubstituted phenyl group; or alternatively, a 2,4,6-trisubstituted phenyl group. Substituents which can be utilized for these specific substituted phenyl groups are independently disclosed herein and can be utilized without limitation to further describe these substituted phenyl groups which can be an X in formula (I).

In some aspects, the aralkyl group which can be an X in formula (I) can be a benzyl group or a substituted benzyl group. In an aspect, the aralkyl group can be a benzyl group or, alternatively, a substituted benzyl group. Substituents which can be utilized for the substituted aralkyl group are independently disclosed herein and can be utilized without limitation to further describe the substituted aralkyl group which can be an X in formula (I).

In an aspect, each non-hydrogen substituent(s) for the substituted cycloalkyl group, substituted aryl group, or substituted aralkyl group which can be an X in formula (I) independently can be a $C_1$ to $C_{18}$ hydrocarbyl group; alternatively, a $C_1$ to $C_8$ hydrocarbyl group; or alternatively, a $C_1$ to $C_5$ hydrocarbyl group. Specific hydrocarbyl groups are independently disclosed herein and can be utilized without limitation to further describe the substituents of the substituted cycloalkyl groups, substituted aryl groups, or substituted aralkyl groups which can be an X in formula (I). For instance, the hydrocarbyl substituent can be an alkyl group, such as a methyl group, an ethyl group, a n-propyl group, an isopropyl group, a n-butyl group, a sec-butyl group, an isobutyl group, a tert-butyl group, a n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group, and the like. Furthermore, the hydrocarbyl substituent can be a benzyl group, a phenyl group, a tolyl group, or a xylyl group, and the like.

A hydrocarboxy group is used generically herein to include, for instance, alkoxy, aryloxy, aralkoxy, (alkyl, aryl, or aralkyl)-O-(alkyl, aryl, or aralkyl) groups, and —O(CO)-(hydrogen or hydrocarbyl) groups, and these groups can comprise up to about 36 carbon atoms (e.g., $C_1$ to $C_{36}$, $C_1$ to $C_{18}$, $C_1$ to $C_{10}$, or $C_1$ to $C_8$ hydrocarboxy groups). Illustrative and non-limiting examples of hydrocarboxy groups which can be an X in formula (I) can include, but are not limited to, a methoxy group, an ethoxy group, an n-propoxy group, an isopropoxy group, an n-butoxy group, a sec-butoxy group, an isobutoxy group, a tert-butoxy group, an n-pentoxy group, a 2-pentoxy group, a 3-pentoxy group, a 2-methyl-1-butoxy group, a tert-pentoxy group, a 3-methyl-1-butoxy group, a 3-methyl-2-butoxy group, a neo-pentoxy group, a phenoxy group, a toloxy group, a xyloxy group, a 2,4,6-trimethylphenoxy group, a benzoxy group, an acetylacetonate group (acac), a formate group, an acetate group, a stearate group, an oleate group, a benzoate group, and the like. In an aspect, the hydrocarboxy group which can be an X in formula (I) can be a methoxy group; alternatively, an ethoxy group; alternatively, an n-propoxy group; alternatively, an isopropoxy group; alternatively, an n-butoxy group; alternatively, a sec-butoxy group; alternatively, an isobutoxy group; alternatively, a tert-butoxy group; alternatively, an n-pentoxy group; alternatively, a 2-pentoxy group; alternatively, a 3-pentoxy group; alternatively, a 2-methyl-1-butoxy group; alternatively, a tert-pentoxy group; alternatively, a 3-methyl-1-butoxy group, alternatively, a 3-methyl-2-butoxy group; alternatively, a neo-pentoxy group; alternatively, a phenoxy group; alternatively, a toloxy group; alternatively, a xyloxy group; alternatively, a 2,4,6-trimethylphenoxy group; alternatively, a benzoxy group; alternatively, an acetylacetonate group; alternatively, a formate group; alternatively, an acetate group; alternatively, a stearate group; alternatively, an oleate group; or alternatively, a benzoate group.

The term hydrocarbylaminyl group is used generically herein to refer collectively to, for instance, alkylaminyl, arylaminyl, aralkylaminyl, dialkylaminyl, diarylaminyl, diaralkylaminyl, and -(alkyl, aryl, or aralkyl)-N-(alkyl, aryl, or aralkyl) groups, and unless otherwise specified, the hydrocarbylaminyl groups which can be an X in formula (I) can comprise up to about 36 carbon atoms (e.g., $C_1$ to $C_{36}$, $C_1$ to $C_{18}$, $C_1$ to $C_{10}$, or $C_1$ to $C_8$ hydrocarbylaminyl groups). Accordingly, hydrocarbylaminyl is intended to cover both (mono)hydrocarbylaminyl and dihydrocarbylaminyl groups. In some aspects, the hydrocarbylaminyl group which can be an X in formula (I) can be, for instance, a methylaminyl group (—NHCH$_3$), an ethylaminyl group (—NHCH$_2$CH$_3$), an n-propylaminyl group (—NHCH$_2$CH$_2$CH$_3$), an iso-propylaminyl group (—NHCH(CH$_3$)$_2$), an n-butylaminyl group (—NHCH$_2$CH$_2$CH$_2$CH$_3$), a t-butylaminyl group (—NHC(CH$_3$)$_3$), an n-pentylaminyl group (—NHCH$_2$CH$_2$CH$_2$CH$_2$CH$_3$), a neo-pentylaminyl group (—NHCH$_2$C(CH$_3$)$_3$), a phenylaminyl group (—NHC$_6$H$_5$), a tolylaminyl group (—NHC$_6$H$_4$CH$_3$), or a xylylaminyl group (—NHC$_6$H$_3$(CH$_3$)$_2$); alternatively, a methylaminyl group; alternatively, an ethylaminyl group; alternatively, a propylaminyl group; or alternatively, a phenylaminyl group. In other aspects, the hydrocarbylaminyl group which can be an X in formula (I) can be, for instance, a dimethylaminyl group (—N(CH$_3$)$_2$), a diethylaminyl group (—N(CH$_2$CH$_3$)$_2$), a di-n-propylaminyl group (—N(CH$_2$CH$_2$CH$_3$)$_2$), a di-iso-propylaminyl group (—N(CH(CH$_3$)$_2$)$_2$), a di-n-butylaminyl group (—N(CH$_2$CH$_2$CH$_2$CH$_3$)$_2$), a di-t-butylaminyl group (—N(C(CH$_3$)$_3$)$_2$), a di-n-pentylaminyl group (—N(CH$_2$CH$_2$CH$_2$CH$_2$CH$_3$)$_2$), a di-neo-pentylaminyl group (—N(CH$_2$C(CH$_3$)$_3$)$_2$), a di-phenylaminyl group (—N(C$_6$H$_5$)$_2$), a di-tolylaminyl group (—N(C$_6$H$_4$CH$_3$)$_2$), or a di-xylylaminyl group (—N(C$_6$H$_3$(CH$_3$)$_2$)$_2$); alternatively, a dimethylaminyl group; alternatively, a di-ethylaminyl group; alternatively, a di-n-propylaminyl group; or alternatively, a di-phenylaminyl group.

In accordance with some aspects disclosed herein, each X independently can be a $C_1$ to $C_{36}$ hydrocarbylsilyl group; alternatively, a $C_1$ to $C_{24}$ hydrocarbylsilyl group; alternatively, a $C_1$ to $C_{18}$ hydrocarbylsilyl group; or alternatively, a $C_1$ to $C_8$ hydrocarbylsilyl group. In an aspect, each hydrocarbyl (one or more) of the hydrocarbylsilyl group can be any hydrocarbyl group disclosed herein (e.g., a $C_1$ to $C_5$ alkyl group, a $C_2$ to $C_5$ alkenyl group, a $C_5$ to $C_8$ cycloalkyl group, a $C_6$ to $C_8$ aryl group, a $C_7$ to $C_8$ aralkyl group, etc.).

As used herein, hydrocarbylsilyl is intended to cover (mono) hydrocarbylsilyl (—SiH$_2$R), dihydrocarbylsilyl (—SiHR$_2$), and trihydrocarbylsilyl (—SiR$_3$) groups, with R being a hydrocarbyl group. In one aspect, the hydrocarbylsilyl group can be a C$_3$ to C$_{36}$ or a C$_3$ to C$_{18}$ trihydrocarbylsilyl group, such as, for example, a trialkylsilyl group or a triphenylsilyl group. Illustrative and non-limiting examples of hydrocarbylsilyl groups which can be an X in formula (I) can include, but are not limited to, trimethylsilyl, triethylsilyl, tripropylsilyl (e.g., triisopropylsilyl), tributylsilyl, tripentylsilyl, triphenylsilyl, allyldimethylsilyl, and the like.

A hydrocarbylaminylsilyl group is used herein to refer to groups containing at least one hydrocarbon moiety, at least one N atom, and at least one Si atom. Illustrative and non-limiting examples of hydrocarbylaminylsilyl groups which can be an X include, but are not limited to, —N(SiMe$_3$)$_2$, —N(SiEt$_3$)$_2$, and the like. Unless otherwise specified, the hydrocarbylaminylsilyl groups which can be an X can comprise up to about 36 carbon atoms (e.g., C$_1$ to C$_{36}$, C$_1$ to C$_{18}$, C$_1$ to C$_{12}$, or C$_1$ to C$_8$ hydrocarbylaminylsilyl groups). In an aspect, each hydrocarbyl (one or more) of the hydrocarbylaminylsilyl group can be any hydrocarbyl group disclosed herein (e.g., a C$_1$ to C$_5$ alkyl group, a C$_2$ to C$_5$ alkenyl group, a C$_5$ to C$_8$ cycloalkyl group, a C$_6$ to C$_8$ aryl group, a C$_7$ to C$_8$ aralkyl group, etc.). Moreover, hydrocarbylaminylsilyl is intended to cover —NH(SiH$_2$R), —NH(SiHR$_2$), —NH(SiR$_3$), —N(SiH$_2$R)$_2$, —N(SiHR$_2$)$_2$, and —N(SiR$_3$)$_2$ groups, among others, with R being a hydrocarbyl group.

In an aspect, each X independently can be —OBR$^X_2$ or —OSO$_2$R$^X$, wherein R$^X$ is a C$_1$ to C$_{36}$ hydrocarbyl group, or alternatively, a C$_1$ to C$_{18}$ hydrocarbyl group. The hydrocarbyl group in OBR$^X_2$ and/or OSO$_2$R$^X$ independently can be any hydrocarbyl group disclosed herein, such as, for instance, a C$_1$ to C$_{18}$ alkyl group, a C$_2$ to C$_{18}$ alkenyl group, a C$_4$ to C$_{18}$ cycloalkyl group, a C$_6$ to C$_{18}$ aryl group, or a C$_7$ to C$_{18}$ aralkyl group; alternatively, a C$_1$ to C$_{12}$ alkyl group, a C$_2$ to C$_{12}$ alkenyl group, a C$_4$ to C$_{12}$ cycloalkyl group, a C$_6$ to C$_{12}$ aryl group, or a C$_7$ to C$_{12}$ aralkyl group; or alternatively, a C$_1$ to C$_8$ alkyl group, a C$_2$ to C$_8$ alkenyl group, a C$_5$ to C$_8$ cycloalkyl group, a C$_6$ to C$_8$ aryl group, or a C$_7$ to C$_8$ aralkyl group.

In one aspect, each X independently can be H, BH$_4$, a halide, or a C$_1$ to C$_{36}$ hydrocarbyl group, hydrocarboxy group, hydrocarbylaminyl group, hydrocarbylsilyl group, or hydrocarbylaminylsilyl group, while in another aspect, each X independently can be H, BH$_4$, or a C$_1$ to C$_{18}$ hydrocarboxy group, hydrocarbylaminyl group, hydrocarbylsilyl group, or hydrocarbylaminylsilyl group. In yet another aspect, each X independently can be a halide; alternatively, a C$_1$ to C$_{18}$ hydrocarbyl group; alternatively, a C$_1$ to C$_{18}$ hydrocarboxy group; alternatively, a C$_1$ to C$_{18}$ hydrocarbylaminyl group; alternatively, a C$_1$ to C$_{18}$ hydrocarbylsilyl group; or alternatively, a C$_1$ to C$_{18}$ hydrocarbylaminylsilyl group. In still another aspect, both X's can be H; alternatively, F; alternatively, Cl; alternatively, Br; alternatively, I; alternatively, BH$_4$; alternatively, a C$_1$ to C$_{18}$ hydrocarbyl group; alternatively, a C$_1$ to C$_{18}$ hydrocarboxy group; alternatively, a C$_1$ to C$_{18}$ hydrocarbylaminyl group; alternatively, a C$_1$ to C$_{18}$ hydrocarbylsilyl group; or alternatively, a C$_1$ to C$_{18}$ hydrocarbylaminylsilyl group.

Each X independently can be, in some aspects, H, a halide, methyl, phenyl, benzyl, an alkoxy, an aryloxy, acetylacetonate, formate, acetate, stearate, oleate, benzoate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a trihydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other aspects, the alkoxy, aryloxy, alkylaminyl, dialkylaminyl, trihydrocarbylsilyl, and hydrocarbylaminylsilyl can be a C$_1$ to C$_{36}$, a C$_1$ to C$_{18}$, a C$_1$ to C$_{12}$, or a C$_1$ to C$_8$ alkoxy, aryloxy, alkylaminyl, dialkylaminyl, trihydrocarbylsilyl, and hydrocarbylaminylsilyl.

Moreover, each X independently can be, in certain aspects, a halide or a C$_1$ to C$_{18}$ hydrocarbyl group; alternatively, a halide or a C$_1$ to C$_8$ hydrocarbyl group; alternatively, F, Cl, Br, I, methyl, benzyl, or phenyl; alternatively, Cl, methyl, benzyl, or phenyl; alternatively, a C$_1$ to C$_{18}$ alkoxy, aryloxy, alkylaminyl, dialkylaminyl, trihydrocarbylsilyl, or hydrocarbylaminylsilyl group; alternatively, a C$_1$ to C$_8$ alkoxy, aryloxy, alkylaminyl, dialkylaminyl, trihydrocarbylsilyl, or hydrocarbylaminylsilyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (I), Cp can be a cyclopentadienyl, indenyl, or fluorenyl group. In one aspect, for instance, Cp can be an unsubstituted cyclopentadienyl, indenyl, or fluorenyl group, while in another aspect, Cp can be a substituted cyclopentadienyl, indenyl, or fluorenyl group. In yet another aspect, Cp can be an unsubstituted cyclopentadienyl group; alternatively, an unsubstituted indenyl group; or alternatively, an unsubstituted fluorenyl group. In still another aspect, Cp can be a substituted cyclopentadienyl group; alternatively, a substituted indenyl group; or alternatively, a substituted fluorenyl group.

Accordingly, Cp can be a cyclopentadienyl, indenyl, or fluorenyl group, and can have one or more substituents. Further, the substituent(s) can be at any suitable position(s) on Cp that conforms to the rules of chemical valence. The substituent (or each substituent independently) can be H, a halide, a C$_1$ to C$_{36}$ hydrocarbyl group, a C$_1$ to C$_{36}$ halogenated hydrocarbyl group, a C$_1$ to C$_{36}$ hydrocarboxy group, or a C$_1$ to C$_{36}$ hydrocarbylsilyl group. Hence, the substituent (or each substituent independently) can be H; alternatively, a halide; alternatively, a C$_1$ to C$_{18}$ hydrocarbyl group; alternatively, a C$_1$ to C$_{18}$ halogenated hydrocarbyl group; alternatively, a C$_1$ to C$_{18}$ hydrocarboxy group; alternatively, a C$_1$ to C$_{18}$ hydrocarbylsilyl group; alternatively, a C$_1$ to C$_{12}$ hydrocarbyl group or a C$_1$ to C$_{12}$ hydrocarbylsilyl group; or alternatively, a C$_1$ to C$_8$ alkyl group or a C$_3$ to C$_8$ alkenyl group. The halide, C$_1$ to C$_{36}$ hydrocarbyl group, C$_1$ to C36 hydrocarboxy group, and C$_1$ to C$_{36}$ hydrocarbylsilyl group which can be a substituent on Cp in formula (I) can be any halide, C$_1$ to C$_{36}$ hydrocarbyl group, C$_1$ to C$_{36}$ hydrocarboxy group, and C$_1$ to C$_{36}$ hydrocarbylsilyl group described herein (e.g., as pertaining to X in formula (I)). A substituent on Cp independently can be, in certain aspects, a C$_1$ to C$_{36}$ halogenated hydrocarbyl group, where the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl ($CF_3$), and the like.

As a non-limiting example, a substituent (or each substituent independently) on Cp can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a 2,6-diisopropylphenyl group, a tolyl group (or other substituted aryl group), a benzyl group, a naphthyl group, a trimethylsilyl group, a triisopropylsilyl group, a triphenylsilyl group, an allyldimethylsilyl group, or a 1-methylcyclohexyl group; alternatively, H; alternatively, Cl; alternatively, $CF_3$; alternatively, a methyl group; alternatively, an ethyl group; alternatively, a propyl group; alternatively, a butyl group; alternatively, a pentyl group; alternatively, a hexyl group; alternatively, a heptyl group; alternatively, an octyl group, a nonyl group; alternatively, a decyl group; alternatively, an ethenyl group; alternatively, a propenyl group; alternatively, a butenyl group; alternatively, a pentenyl group; alternatively, a hexenyl group; alternatively, a heptenyl group; alternatively, an octenyl group; alternatively, a nonenyl group; alternatively, a decenyl group; alternatively, a phenyl group; alternatively, a 2,6-diisopropylphenyl group; alternatively, a tolyl group; alternatively, a benzyl group; alternatively, a naphthyl group; alternatively, a trimethylsilyl group; alternatively, a triisopropylsilyl group; alternatively, a triphenylsilyl group; alternatively, an allyldimethylsilyl group; or alternatively, a 1-methylcyclohexyl group.

In one aspect, for example, a substituent (or each substituent independently) on Cp can be H or a $C_1$ to $C_{18}$ hydrocarbyl group; alternatively, a $C_1$ to $C_{10}$ hydrocarbyl group; alternatively, a $C_1$ to $C_6$ linear or branched alkyl group (e.g., a tert-butyl group); alternatively, H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a 2,6-diisopropylphenyl group, a tolyl group, a benzyl group, a naphthyl group, a trimethylsilyl group, a triisopropylsilyl group, a triphenylsilyl group, an allyldimethylsilyl group, or a 1-methylcyclohexyl group, and the like; alternatively, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a 2,6-diisopropylphenyl group, a tolyl group, or a benzyl group; alternatively, a methyl group, an ethyl group, a propyl group, a butyl group, a pentyl group, or a hexyl group; alternatively, a methyl group; alternatively, an ethyl group; alternatively, a propyl group; alternatively, a butyl group; or alternatively, a tert-butyl group.

In formula (I), L can be any phosphinimide or iminoimidazolidide ligand disclosed herein. In one aspect, for instance, the half-metallocene titanium compound can have the structure of formula (II):

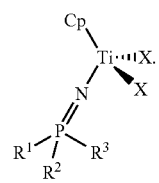

(II)

In another aspect, the half-metallocene titanium compound can have the structure of formula (III):

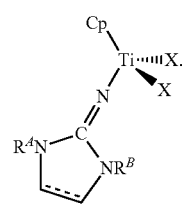

(III)

In formulas (II) and (III), each Cp and X independently can be any Cp and X described herein (e.g., as pertaining to Cp and X in formula (I)). $R^1$, $R^2$, $R^3$, $R^A$, and $R^B$ independently can be H or a halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group. The halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group which can be $R^1$, $R^2$, $R^3$, $R^A$, and/or $R^B$ can be any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group described herein (e.g., as pertaining to substituent options for Cp in formula (I)).

In formula (II), $R^1$, $R^2$, and $R^3$ can be either the same or a different substituent group. In one aspect, $R^1$, $R^2$, and $R^3$ independently can be H, a $C_1$ to $C_{18}$ hydrocarbyl group, or a $C_1$ to $C_{18}$ hydrocarbylsilyl group. In another aspect, $R^1$, $R^2$, and $R^3$ independently can be H or a $C_1$ to $C_{18}$ hydrocarbyl group. In yet another aspect, $R^1$, $R^2$, and $R^3$ independently can be a $C_1$ to $C_6$ linear or branched alkyl group (e.g., an isopropyl group, a tert-butyl group) or a $C_3$ to $C_8$ alkenyl group (e.g., a terminal alkenyl group). In still another aspect, $R^1$, $R^2$, and $R^3$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a 2,6-diisopropylphenyl group, a tolyl group, a benzyl group, a naphthyl group, a trimethylsilyl group, a triisopropylsilyl group, a triphenylsilyl group, an allyldimethylsilyl group, or a 1-methylcyclohexyl group, and the like. In some aspects, at least one of $R^1$, $R^2$, and $R^3$ can be an alkenyl group, such as a $C_3$ to $C_{12}$ alkenyl group, or a $C_3$ to $C_8$ terminal alkenyl group.

In formula (III), $R^A$ and $R^B$ can be either the same or a different substituent group. In one aspect, $R^A$ and $R^B$ independently can be H, a $C_1$ to $C_{18}$ hydrocarbyl group, or a $C_1$ to $C_{18}$ hydrocarbylsilyl group. In another aspect, $R^A$ and $R^B$ independently can be H or a $C_1$ to $C_{18}$ hydrocarbyl group. In yet another aspect, $R^A$ and $R^B$ independently can be a $C_1$ to $C_6$ linear or branched alkyl group (e.g., a methyl group, an isopropyl group, a tert-butyl group). In still another aspect, $R^A$ and $R^B$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a phenyl group, a 2,6-diisopropylphenyl group, a tolyl group, a benzyl group, a naphthyl group, a trimethylsilyl group, a triisopropylsilyl group, a triphenylsilyl group, an allyldimethylsilyl group, or a 1-methylcyclohexyl group, and the like. In some aspects, the heterocyclic carbene group can be saturated, while in other aspects, the heterocyclic carbene group can be unsaturated.

Illustrative and non-limiting examples of half-metallocene titanium compounds—having the structure of formula (I), formula (II), and/or formula (III)—suitable for use in catalyst systems and polymerization processes encompassed herein can include the following compounds (tBu=tert-butyl; Ph=phenyl; Cy=cyclohexyl; iPr=isopropyl; X=a monoanionic ligand, such as Cl):

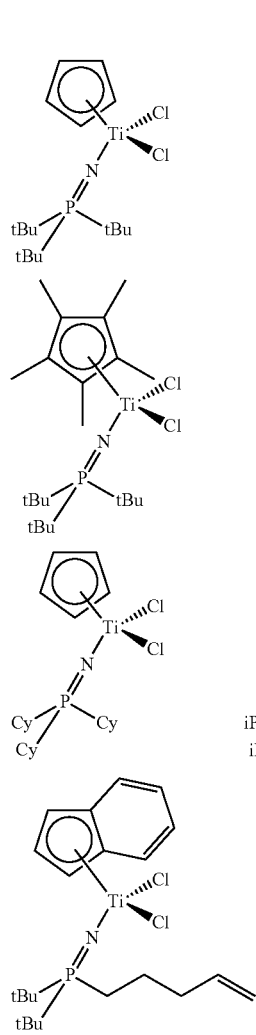

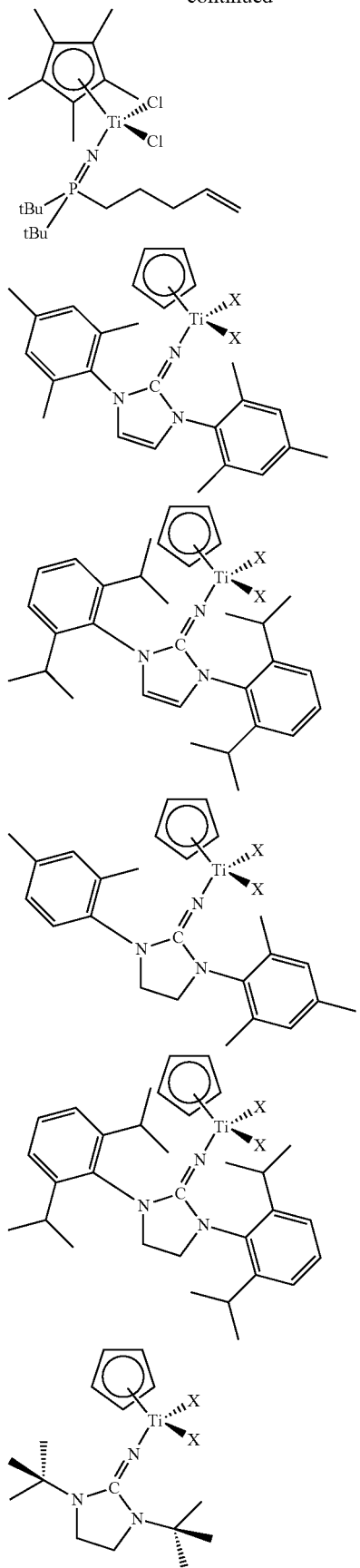

-continued

-continued

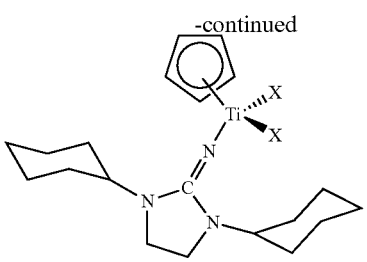

and the like.

Methods of making half-metallocene titanium phosphinimide and half-metallocene titanium iminoimidazolidide compounds of the present invention also are encompassed herein. These half-metallocene complexes can be synthesized by various suitable procedures, such as those described in Organometallics 2001, 20, 4424, the disclosure of which is incorporated herein by reference in its entirety.

Using analogous synthesis schemes, half-metallocene complexes with substituents on the phosphorus atom other than tert-butyl or pentenyl can be derived, and complexes with cyclopentadienyl or indenyl groups with various hydrocarbyl and other substituents can be derived. Moreover, using analogous synthesis schemes, half-metallocene complexes with monoanionic ligands other than Cl (e.g., hydrocarbyl, hydrocarbylaminyl, hydrocarbylsilyl, etc.) can be derived.

Second Metallocene Compounds

In certain aspects of this invention, the catalyst system can contain a second metallocene compound, in addition to the titanium half-metallocene compound. For example, the second metallocene compound can comprise a bridged metallocene compound. In one aspect, the second metallocene compound can comprise a bridged zirconium or hafnium based metallocene compound. In another aspect, the second metallocene compound can comprise a bridged zirconium or hafnium based metallocene compound with an alkenyl substituent. In yet another aspect, the second metallocene compound can comprise a bridged zirconium or hafnium based metallocene compound with an alkenyl substituent and a fluorenyl group. In still another aspect, the second metallocene compound can comprise a bridged zirconium or hafnium based metallocene compound with a cyclopentadienyl group and a fluorenyl group, and with an alkenyl substituent on the bridging group and/or on the cyclopentadienyl group.

In an aspect, the second metallocene compound can comprise a single atom bridged metallocene compound with a fluorenyl group. In another aspect, the second metallocene compound can comprise a single atom bridged metallocene compound with a fluorenyl group and either a cyclopentadienyl group or an indenyl group. In yet another aspect, the second metallocene compound can comprise a single atom bridged metallocene compound with a fluorenyl group and a cyclopentadienyl group. In still another aspect, the second metallocene compound can comprise a single atom bridged metallocene compound with a fluorenyl group and an indenyl group.

In these and other aspects, the bridged metallocene compound can contain an aryl substituent (e.g., a phenyl group) on the bridging atom. Additionally or alternatively, the bridged metallocene compound can contain an alkenyl substituent, for example, on the bridging atom, and/or on the fluorenyl group, and/or on the cyclopentadienyl or indenyl group.

Illustrative and non-limiting examples of bridged metallocene compounds that are suitable for use as a second metallocene compound can include the following compounds (Me=methyl, Ph=phenyl; t-Bu=tert-butyl):

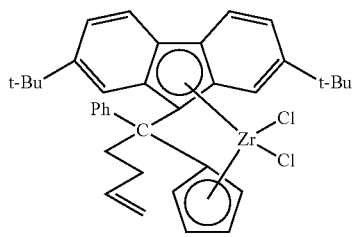

(14)

(15)

(16)

(17)

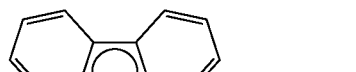

(18)

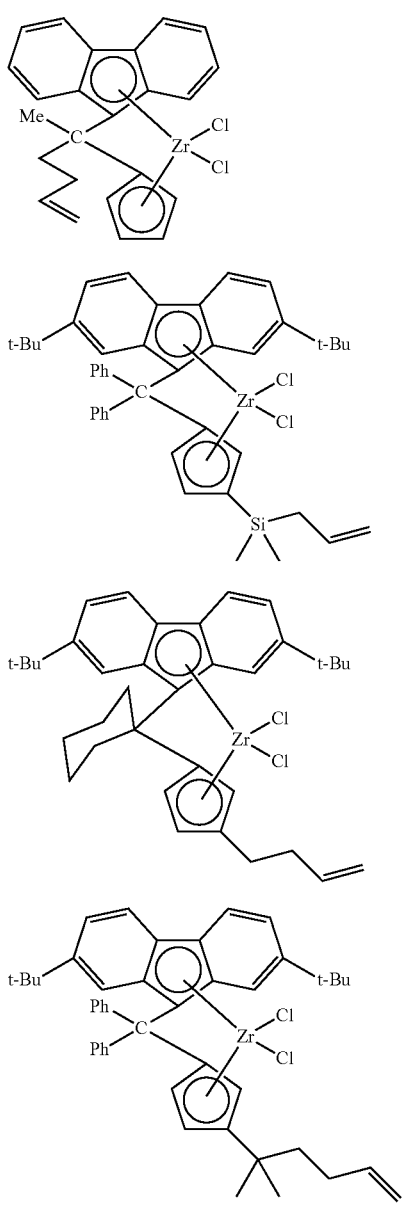
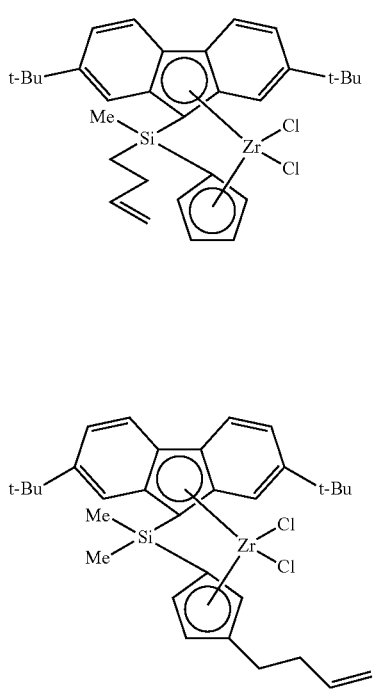
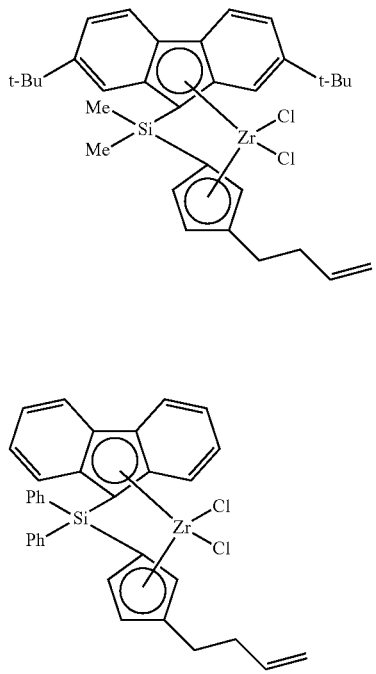
and the like, as well as combinations thereof.
Further examples of bridged metallocene compounds that are suitable for use as a second metallocene compound can include, but are not limited to, the following compounds:
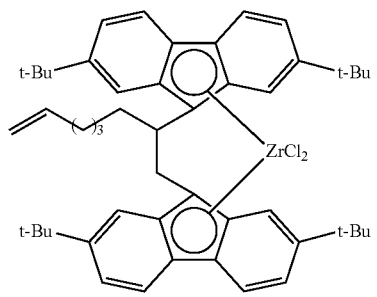
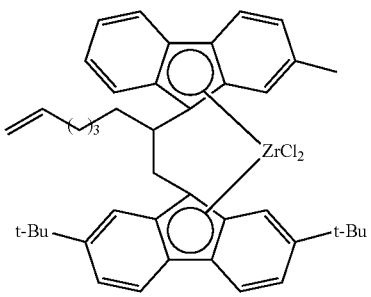

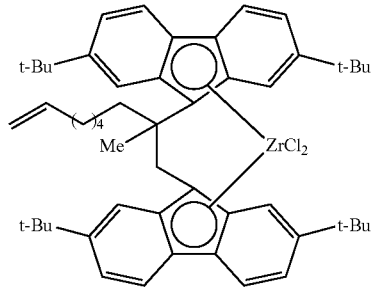

(28)

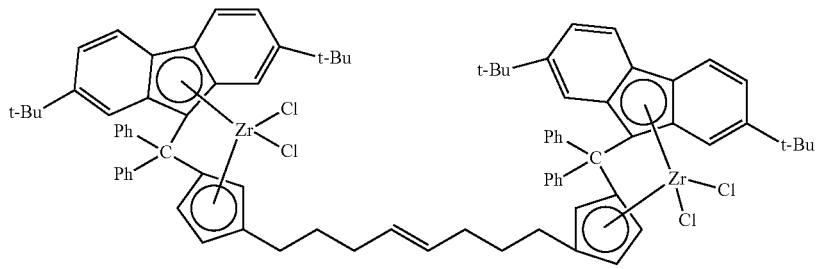

(29)

and the like, as well as combinations thereof.

The second metallocene compound is not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, and 7,619,047, which are incorporated herein by reference in their entirety.

In certain aspects of this invention, the catalyst system can contain a second metallocene compound, in addition to the titanium half-metallocene compound, and the second metallocene compound can comprise an unbridged metallocene compound. In one aspect, the second metallocene compound can comprise an unbridged zirconium or hafnium based metallocene compound and/or an unbridged zirconium and/or hafnium based dinuclear metallocene compound. In another aspect, the second metallocene compound can comprise an unbridged zirconium or hafnium based metallocene compound containing two cyclopentadienyl groups, two indenyl groups, or a cyclopentadienyl and an indenyl group. In another aspect, the second metallocene compound can comprise an unbridged zirconium or hafnium based metallocene compound containing two cyclopentadienyl groups. In yet another aspect, the second metallocene compound can comprise an unbridged zirconium or hafnium based metallocene compound containing two indenyl groups. In still another aspect, the second metallocene compound can comprise an unbridged zirconium or hafnium based metallocene compound containing a cyclopentadienyl and an indenyl group.

In an aspect, the second metallocene compound can comprise an unbridged zirconium based metallocene compound containing two cyclopentadienyl groups, two indenyl groups, or a cyclopentadienyl and an indenyl group, while in another aspect, the second metallocene compound can comprise a dinuclear unbridged metallocene compound with an alkenyl linking group.

Illustrative and non-limiting examples of unbridged metallocene compounds that are suitable for use as the second metallocene compound can include the following compounds (Ph=phenyl):

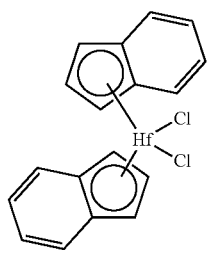

(1)

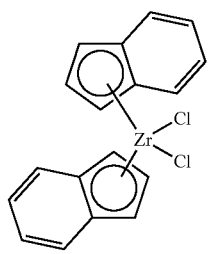

(2)

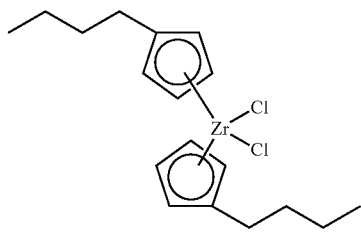

(3)

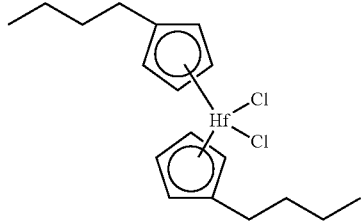

(4)

(5) 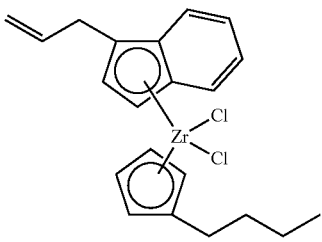

(6) 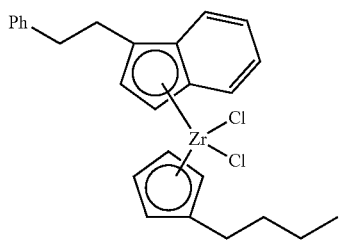

(7) 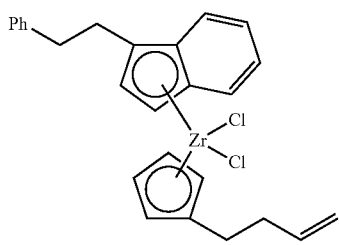

(8) 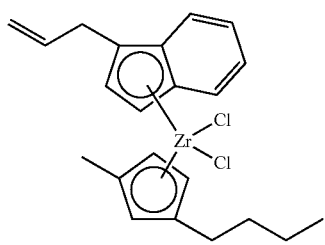

(9) 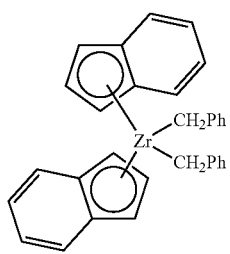

(10) 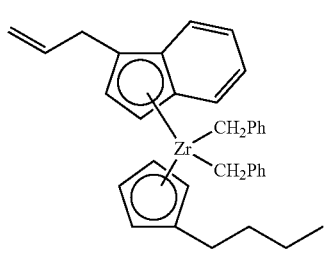

(11) 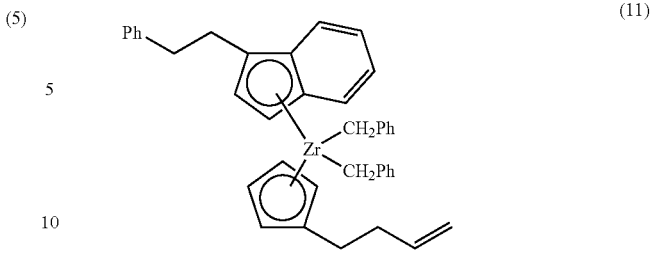

and the like, as well as combinations thereof.

The second metallocene compound is not limited solely to unbridged metallocene compounds such as described above, or to suitable unbridged metallocene compounds disclosed in U.S. Pat. Nos. 7,199,073, 7,226,886, 7,312,283, and 7,619,047, which are incorporated herein by reference in their entirety. For example, the second metallocene compound can comprise an unbridged dinuclear metallocene compound, such as those described in U.S. Pat. Nos. 7,919,639 and 8,080,681, the disclosures of which are incorporated herein by reference in their entirety. Illustrative and non-limiting examples of dinuclear metallocene compounds suitable for use as the second catalyst compound include the following compounds:

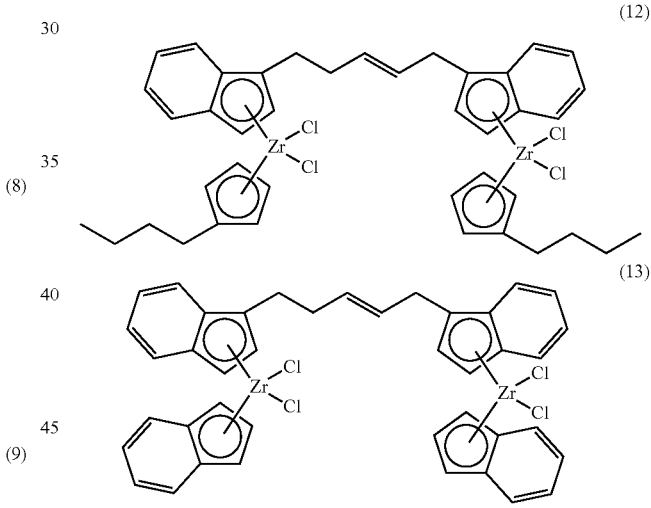

(12)

(13)

and the like, as well as combinations thereof.

Activator-Supports

The present invention encompasses various catalyst compositions containing an activator-support. In one aspect, the activator-support can comprise a solid oxide treated with an electron-withdrawing anion. Alternatively, in another aspect, the activator-support can comprise a solid oxide treated with an electron-withdrawing anion, the solid oxide containing a Lewis-acidic metal ion. Non-limiting examples of suitable activator-supports are disclosed in, for instance, U.S. Pat. Nos. 7,294,599, 7,601,665, 7,884,163, 8,309,485, 8,623,973, and 8,703,886, which are incorporated herein by reference in their entirety.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163.

Accordingly, in one aspect, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another aspect, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have an silica content from about 5 to about 95% by weight. In one aspect, the silica content of these solid oxides can be from about 10 to about 80%, or from about 20% to about 70%, silica by weight. In another aspect, such materials can have silica contents ranging from about 15% to about 60%, or from about 25% to about 50%, silica by weight. The solid oxides contemplated herein can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The activator-support generally can contain from about 1 to about 25 wt. % of the electron-withdrawing anion, based on the weight of the activator-support. In particular aspects provided herein, the activator-support can contain from about 1 to about 20 wt. %, from about 2 to about 20 wt. %, from about 3 to about 20 wt. %, from about 2 to about 15 wt. %, from about 3 to about 15 wt. %, from about 3 to about 12 wt. %, or from about 4 to about 10 wt. %, of the electron-withdrawing anion, based on the total weight of the activator-support.

In an aspect, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, as well as any mixture or combination thereof. In another aspect, the activator-support employed in the catalyst systems described herein can be, or can comprise, a fluorided solid oxide and/or a sulfated solid oxide, non-limiting examples of which can include fluorided alumina, sulfated alumina, fluorided silica-alumina, sulfated silica-alumina, fluorided silica-zirconia, fluorided silica-coated alumina, sulfated silica-coated alumina, and the like, as well as combinations thereof. In yet another aspect, the activator-support can comprise fluorided alumina; alternatively, chlorided alumina; alternatively, sulfated alumina; alternatively, fluorided silica-alumina; alternatively, sulfated silica-alumina; alternatively, fluorided silica-zirconia; alternatively, chlorided silica-zirconia; alternatively, sulfated silica-coated alumina; or alternatively, fluorided silica-coated alumina. In some aspects, the activator-support can comprise a fluorided solid oxide, while in other aspects, the activator-support can comprise a sulfated solid oxide.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, etc.) are well known to those of skill in the art.

Co-Catalysts

In certain aspects directed to catalyst compositions containing a co-catalyst, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth. The hydrocarbyl group (or alkyl group) can be any hydrocarbyl (or alkyl) group disclosed herein. Moreover, in some aspects, the metal of the metal hydrocarbyl can be a group 1, 2, 11, 12, 13, or 14 metal; alternatively, a group 13 or 14 metal; or alternatively, a group 13 metal. Hence, in some aspects, the metal of the metal hydrocarbyl (non-halide metal hydrocarbyl or metal hydrocarbyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium or calcium; alternatively, lithium; alternatively, sodium; alternatively, potassium; alternatively, magnesium; alternatively, calcium; alternatively, zinc; alternatively, boron; alternatively, aluminum; or alternatively, tin. In some aspects, the metal hydrocarbyl or metal alkyl, with or without a halide, can comprise a lithium hydrocarbyl or alkyl, a magnesium hydrocarbyl or alkyl, a boron hydrocarbyl or alkyl, a zinc hydrocarbyl or alkyl, or an aluminum hydrocarbyl or alkyl.

In particular aspects directed to catalyst compositions containing a co-catalyst (e.g., the activator can comprise a solid oxide treated with an electron-withdrawing anion), the co-catalyst can comprise an aluminoxane compound, an organoboron or organoborate compound, an ionizing ionic compound, an organoaluminum compound, an organozinc compound, an organomagnesium compound, or an organolithium compound, and this includes any combinations of these materials. In one aspect, the co-catalyst can comprise an organoaluminum compound. In another aspect, the co-catalyst can comprise an aluminoxane compound, an organoboron or organoborate compound, an ionizing ionic compound, an organozinc compound, an organomagnesium compound, an organolithium compound, or any combination thereof. In yet another aspect, the co-catalyst can comprise an aluminoxane compound; alternatively, an organoboron or organoborate compound; alternatively, an ionizing ionic compound; alternatively, an organozinc compound; alternatively, an organomagnesium compound; or alternatively, an organolithium compound.

Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoboron/organoborate compounds include N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, tris(pentafluorophenyl)boron, tris[3,5-bis(trifluoromethyl)phenyl]boron, and the like, or mixtures thereof.

Examples of ionizing ionic compounds can include, but are not limited to, the following compounds: tri(n-butyl)ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl] borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl) borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate, and the like, or combinations thereof.

Exemplary organozinc compounds which can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof.

Similarly, exemplary organomagnesium compounds can include, but are not limited to, dimethylmagnesium, diethylmagnesium, dipropylmagnesium, dibutylmagnesium, dineopentylmagnesium, di(trimethylsilylmethyl)magnesium, methylmagnesium chloride, ethylmagnesium chloride, propylmagnesium chloride, butylmagnesium chloride, neopentylmagnesium chloride, trimethylsilylmethylmagnesium chloride, methylmagnesium bromide, ethylmagnesium bromide, propylmagnesium bromide, butylmagnesium bromide, neopentylmagnesium bromide, trimethylsilylmethylmagnesium bromide, methylmagnesium iodide, ethylmagnesium iodide, propylmagnesium iodide, butylmagnesium iodide, neopentylmagnesium iodide, trimethylsilylmethylmagnesium iodide, methylmagnesium ethoxide, ethylmagnesium ethoxide, propylmagnesium ethoxide, butylmagnesium ethoxide, neopentylmagnesium ethoxide, trimethylsilylmethylmagnesium ethoxide, methylmagnesium propoxide, ethylmagnesium propoxide, propylmagnesium propoxide, butylmagnesium propoxide, neopentylmagnesium propoxide, trimethylsilylmethylmagnesium propoxide, methylmagnesium phenoxide, ethylmagnesium phenoxide, propylmagnesium phenoxide, butylmagnesium phenoxide, neopentylmagnesium phenoxide, trimethylsilylmethylmagnesium phenoxide, and the like, or any combinations thereof.

Likewise, exemplary organolithium compounds can include, but are not limited to, methyllithium, ethyllithium, propyllithium, butyllithium (e.g., t-butyllithium), neopentyllithium, trimethylsilylmethyllithium, phenyllithium, tolyllithium, xylyllithium, benzyllithium, (dimethylphenyl) methyllithium, allyllithium, and the like, or combinations thereof.

Co-catalysts that can be used in the catalyst compositions of this invention are not limited to the co-catalysts described above. Other suitable co-catalysts are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Olefin Monomers

Unsaturated reactants that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (a), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof alternatively, the comonomer can comprise 1-butene, 1-hexene, 1-octene, or any combination thereof alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent of the comonomer based on the total weight of the monomer and comonomer. According to another aspect of the present invention, the amount of comonomer introduced into a polymerization reactor system can be from about 0.01 to about 40 weight percent comonomer based on the total weight of the monomer and comonomer. In still another aspect, the amount of comonomer introduced into a polymerization reactor system can be from about 0.1 to about 35 weight percent comonomer based on the total weight of the monomer and comonomer. Yet, in another aspect, the amount of comonomer introduced into a polymerization reactor system can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Catalyst Compositions

In some aspects, the present invention employs catalyst compositions containing a half-metallocene titanium compound (optionally, a second metallocene compound) and an activator-support (one or more than one). These catalyst compositions can be utilized to produce polyolefins—homopolymers, copolymers, and the like—for a variety of end-use applications. Half-metallocene titanium compounds and optional second metallocene compounds are discussed hereinabove. In aspects of the present invention, it is contemplated that the catalyst composition can contain more than one half-metallocene titanium compound and/or more than one second metallocene compound. Further, additional catalytic compounds—other than those specified as a half-metallocene titanium compound or a second metallocene compound—can be employed in the catalyst compositions and/or the polymerization processes, provided that the additional catalytic compound does not detract from the advantages disclosed herein. Additionally, more than one activator-support also may be utilized.

Generally, catalyst compositions of the present invention comprise a half-metallocene titanium compound having formula (I) (e.g., formula (II) or (III)) and an activator-support (e.g., a solid oxide treated with an electron-withdrawing anion). Activator-supports useful in the present invention are disclosed herein. Optionally, such catalyst compositions can further comprise one or more than one second metallocene compound or compounds, and/or can further comprise one or more than one co-catalyst compound or compounds (suitable co-catalysts, such as organoaluminum compounds, also are discussed herein). Thus, a catalyst composition of this invention can comprise a half-metallocene titanium compound, an activator-support, and an organoaluminum compound (and optionally, a second metallocene compound). For instance, the activator-support can comprise (or consist essentially of, or consist of) fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof; or alternatively, a fluorided solid oxide and/or a sulfated solid oxide. Additionally, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof. Accordingly, a catalyst composition consistent with aspects of the invention can comprise (or consist essentially of, or consist of) a half-metallocene titanium compound; sulfated alumina (or fluorided silica-alumina, or fluorided silica-coated alumina); and triethylaluminum (or triisobutylaluminum). Optionally, dual catalyst systems can contain a half-metallocene titanium compound and a second metallocene compound, as described herein.

In one aspect, a catalyst composition of the present invention can comprise a half-metallocene titanium compound having formula (II) or (III), a fluorided solid oxide, and optionally, a co-catalyst, such as an organoaluminum compound. Yet, in another aspect, a catalyst composition of the present invention can comprise a half-metallocene titanium compound having formula (II) or (III), a sulfated solid oxide, and optionally, a co-catalyst, such as an organoaluminum compound. Additionally, a second metallocene compound can be included in these catalyst compositions, if desired.

In another aspect of the present invention, a catalyst composition is provided which comprises a half-metallocene titanium compound, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed below, in the absence of these additional materials. For example, a catalyst composition of the present invention can consist essentially of a half-metallocene titanium compound, an activator-support, and an organoaluminum compound, wherein no other materials are present in the catalyst composition which would increase/decrease the activity of the catalyst composition by more than about 10% from the catalyst activity of the catalyst composition in the absence of said materials.

However, in other aspects of this invention, these co-catalysts can be employed. For example, a catalyst composition comprising a half-metallocene titanium compound and an activator-support can further comprise an optional co-catalyst. Suitable co-catalysts in this aspect can include, but are not limited to, aluminoxane compounds, organoboron or organoborate compounds, ionizing ionic compounds, organoaluminum compounds, organozinc compounds, organomagnesium compounds, organolithium compounds, and the like, or any combination thereof; or alternatively, organoaluminum compounds, organozinc compounds, organomagnesium compounds, organolithium compounds, or any combination thereof. More than one co-catalyst can be present in the catalyst composition.

In a particular aspect contemplated herein, the catalyst composition is a catalyst composition comprising an activator-support (one or more than one) and only one half-metallocene titanium compound. In these and other aspects, the catalyst composition can comprise an activator-support comprising a solid oxide treated with an electron-withdrawing anion, only one half-metallocene titanium compound, and a co-catalyst (one or more than one), such as an organoaluminum compound.

This invention further encompasses methods of making these catalyst compositions, such as, for example, contacting the respective catalyst components in any order or sequence. In one aspect, the catalyst composition can be produced by a process comprising contacting the half-metallocene titanium compound and the activator-support, while in another aspect, the catalyst composition can be produced by a process comprising contacting, in any order, the half-metallocene titanium compound, the activator-support, and the co-catalyst.

Generally, the weight ratio of organoaluminum compound to activator-support can be in a range from about 10:1 to about 1:1000. If more than one organoaluminum compound and/or more than one activator-support are employed, this ratio is based on the total weight of each respective component. In another aspect, the weight ratio of the organoaluminum compound to the activator-support can be in a range from about 3:1 to about 1:100, or from about 1:1 to about 1:50.

In some aspects of this invention, the weight ratio of half-metallocene titanium compound to activator-support can be in a range from about 1:1 to about 1:1,000,000. If more than one half-metallocene titanium compound and/or more than activator-support is/are employed, this ratio is based on the total weights of the respective components. In another aspect, this weight ratio can be in a range from about 1:5 to about 1:100,000, or from about 1:10 to about 1:10,000. Yet, in another aspect, the weight ratio of the half-metallocene titanium compound to the activator-support can be in a range from about 1:20 to about 1:1000.

Catalyst compositions of the present invention generally have a catalyst activity greater than about 10 kg of ethylene polymer (homopolymer or copolymer, as the context requires) per gram of the half-metallocene titanium compound per hour (abbreviated kg/g/h). In another aspect, the catalyst activity can be greater than about 25, greater than about 35, or greater than about 40 kg/g/h. In still another aspect, catalyst compositions of this invention can be characterized by having a catalyst activity greater than about 50, greater than about 100, or greater than about 150 kg/g/h, and often can range up to 400, up to 500, or up to 750 kg/g/h. These activities are measured under slurry polymerization conditions, with a triisobutylaluminum co-catalyst, using isobutane as the diluent, at a polymerization temperature of 80° C. and a reactor pressure of about 340 psig. Additionally, in some aspects, the activator-support can comprise sulfated alumina, fluorided silica-alumina, or fluorided silica-coated alumina, although not limited thereto.

In aspects of this invention where the catalyst composition contains a second metallocene compound, the weight ratio of the half-metallocene titanium compound to the second metallocene compound (e.g., a bridged metallocene, an unbridged metallocene) in the catalyst composition can be in a range from about 10:1 to about 1:10, from about 8:1 to about 1:8, from about 5:1 to about 1:5, from about 4:1 to about 1:4, from about 3:1 to about 1:3; from about 2:1 to about 1:2, from about 1.5:1 to about 1:1.5, from about 1.25:1 to about 1:1.25, or from about 1.1:1 to about 1:1.1.

Polymerization Processes

Catalyst compositions of the present invention can be used to polymerize olefins to form homopolymers, copolymers, terpolymers, and the like. One such process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise a half-metallocene titanium compound, an activator-support, and an optional co-catalyst, and an optional second metallocene compound. Suitable half-metallocene titanium compounds, second metallocene compounds, activator-supports, and co-catalysts are discussed herein.

In accordance with one aspect of the invention, the polymerization process can employ a catalyst composition comprising a half-metallocene titanium compound having formula (II) or (III) and an activator-support. The catalyst composition, optionally, can further comprise one or more than one organoaluminum compound or compounds (or other suitable co-catalyst), and/or can further comprise one or more than one second metallocene compound or compounds. Thus, a process for polymerizing olefins in the presence of a catalyst composition can employ a catalyst composition comprising a half-metallocene titanium compound, an activator-support, and an organoaluminum compound. In some aspects, the activator-support can comprise (or consist essentially of, or consist of) fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof; alternatively, a fluorided solid oxide and/or a sulfated solid oxide; alternatively, a fluorided solid oxide; or alternatively, a sulfated solid oxide. In some aspects, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof. Optionally, polymerization processes consistent with aspects of this invention can employ a dual catalyst system containing a half-metallocene titanium compound and a second metallocene compound, as described herein.

In accordance with another aspect of the invention, the polymerization process can employ a catalyst composition comprising a half-metallocene titanium compound, an activator-support, and an optional co-catalyst, wherein the co-catalyst can comprise an aluminoxane compound, an organoboron or organoborate compound, an ionizing ionic compound, an organoaluminum compound, an organozinc compound, an organomagnesium compound, or an organolithium compound, or any combination thereof. Hence, aspects of this invention are directed to a process for polymerizing olefins in the presence of a catalyst composition, the process comprising contacting a catalyst composition with an olefin monomer and optionally an olefin comonomer (one or more) under polymerization conditions to produce an olefin polymer, and the catalyst composition can comprise a half-metallocene titanium compound, an activator-support, and an aluminoxane compound; alternatively, a half-metallocene titanium compound, an activator-support, and an organoboron or organoborate compound; alternatively, a half-metallocene titanium compound, an activator-support, and an ionizing ionic compound; alternatively, a half-metallocene titanium compound, an activator-support, and an organoaluminum compound; alternatively, a half-metallocene titanium compound, an activator-support, and an organozinc compound; alternatively, a half-metallocene titanium compound, an activator-support, and an organomagnesium compound; or alternatively, a half-metallocene titanium compound, an activator-support, and an organolithium compound. Furthermore, more than one co-catalyst can be employed, e.g., an organoaluminum compound and an aluminoxane compound, an organoaluminum compound and an ionizing ionic compound, etc.

In accordance with another aspect of the invention, the polymerization process can employ a catalyst composition comprising only one half-metallocene titanium compound, an activator-support, and an organoaluminum compound.

The catalyst compositions of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Processes can also include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect of the invention, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under polymerization conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor system can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the invention, the polymerization reactor system can comprise a solution polymerization reactor wherein the monomer (and comonomer, if used) are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactor systems suitable for the present invention can further comprise any combination of at least one raw material feed system, at least one feed system for catalyst or catalyst components, and/or at least one polymer recovery system. Suitable reactor systems for the present invention can further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can fall within a range from about 65° C. to about 110° C., from about 70° C. to about 100° C., from about 70° C. to about 95° C., or from about 75° C. to about 95° C. Various polymerization conditions can be held substantially constant, for example, for the production of a particular grade of olefin polymer.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages.

In a particular aspect, and unexpectedly, a polymerization process can comprise contacting a catalyst composition with an olefin monomer and, optionally, an olefin comonomer under polymerization conditions to produce an olefin polymer (e.g., an ethylene homopolymer or copolymer) characterized by a ratio of Mw/Mn in a range from about 4 to about 10 (or from about 5 to about 9), a ratio of HLMI/MI in a range from about 15 to about 75 (or from about 25 to about 55), a density in a range from about 0.89 to about 0.97 g/cm$^3$ (or from about 0.92 to about 0.94 g/cm$^3$), less than or equal to about 0.008 long chain branches (LCB) per 1000 total carbon atoms (or less than or equal to about 0.003 LCB), and a conventional comonomer distribution (e.g., the number of short chain branches (SCB) per 1000 total carbon atoms of the polymer at Mn is greater than at Mz). The catalyst composition utilized in this process can comprise a half-metallocene titanium compound, a fluorided solid oxide (e.g., fluorided silica-alumina, fluorided silica-coated alumina, etc.) or a sulfate solid oxide (e.g., sulfated alumina, etc.), and an optional co-catalyst (e.g., an organoaluminum compound).

Aspects of this invention also are directed to olefin polymerization processes conducted in the absence of added hydrogen. An olefin polymerization process of this invention can comprise contacting a catalyst composition with an olefin monomer and optionally an olefin comonomer in a polymerization reactor system under polymerization conditions to produce an olefin polymer, wherein the catalyst composition can comprise a half-metallocene titanium compound, an activator-support, and an optional co-catalyst, and wherein the polymerization process is conducted in the absence of added hydrogen (no hydrogen is added to the polymerization reactor system). As one of ordinary skill in the art would recognize, hydrogen can be generated in-situ by transition metal-based catalyst compositions in various olefin polymerization processes, and the amount generated can vary depending upon the specific catalyst composition and transition metal compound employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a catalyst composition with an olefin monomer and optionally an olefin comonomer in a polymerization reactor system under polymerization conditions to produce an olefin polymer, wherein the catalyst composition comprises a half-metallocene titanium compound, an activator-support, and an optional co-catalyst, and wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The added hydrogen to olefin monomer ratio in the process can be controlled at a weight ratio which falls within a range from about 25 ppm to about 1500 ppm, from about 50 to about 1000 ppm, or from about 100 ppm to about 750 ppm.

Unexpectedly, the catalyst compositions and polymerization processes of the present invention can be much more sensitive to hydrogen than comparable catalyst systems and processes employing Ziegler catalysts. In one aspect, for example, an increase in the melt index of the olefin polymer with the addition of 150 ppmw hydrogen (from 0 to 150 ppm by weight of hydrogen based on the olefin monomer, using the catalyst compositions and polymerization processes described herein) can be greater than the increase in the melt index of an olefin polymer obtained using a Ziegler catalyst system, under the same polymerization conditions. For instance, the melt index of the olefin polymer (e.g., an ethylene/1-hexene copolymer) produced by the process can have an increase in melt index of at least about 1 g/10 min, based on an increase in hydrogen:monomer weight ratio (e.g., a hydrogen:ethylene weight ratio) from 0 to 150 ppmw. In some aspects, this increase in hydrogen can result in an increase of melt index of at least about 1.2 g/10 min, of at least about 1.5 g/10 min, or of at least about 2 g/10 min, and in some instances, up to about 3 g/10 min, or up to about 5 g/10 min.

In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio within a range from about 5 ppm up to about 1000 ppm or so, and maintained at the ratio to within about +/−25% during the polymerization run. For instance, if the target ratio is 100 ppm, then maintaining the hydrogen:olefin monomer ratio substantially constant would entail maintaining the feed ratio between about 75 ppm and about 125 ppm. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

In a particular aspect, and unexpectedly, the Mw/Mn ratio of the olefin polymer produced by the process can decrease as the amount of an organozinc compound (e.g., diethylzinc) added to the polymerization reactor system increases. For instance, the Mw/Mn ratio of the polymer produced by the process in the absence of the organozinc compound can be greater than the Mw/Mn of a polymer produced by the process in the presence of the organozinc compound, under the same polymerization conditions. Additionally or alternatively, the z-average molecular weight (Mz) of the olefin polymer produced by the process can decrease as the amount of an organozinc compound (e.g., diethylzinc) added to the polymerization reactor system increases. For instance, the Mz of the polymer produced by the process in the absence of the organozinc compound can be greater than the Mz of a polymer produced by the process in the presence of the organozinc compound, under the same polymerization conditions. The same polymerization conditions means that all components used to prepare the catalyst systems are held constant (e.g., same amount/type of half-metallocene compound, same amount/type of co-catalyst, same amount/type of activator, such as fluorided silica-coated alumina, etc.) and all polymerization conditions are held constant (e.g., same polymerization temperature, same pressure, etc.). Hence, the only difference is the amount of the organozinc compound present during the polymerization.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers (e.g., ethylene/α-olefin copolymers, ethylene homopolymers, etc.) produced by any of the polymerization processes disclosed herein. Articles of manufacture can be formed from, and/or can comprise, the polymers produced in accordance with this invention.

Polymers and Articles

Olefin polymers encompassed herein can include any polymer produced from any olefin monomer and comonomer(s) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene copolymer, an ethylene terpolymer, a propylene terpolymer, and the like, including combinations thereof. In one aspect, the olefin polymer can be an ethylene/1-butene copolymer, an ethylene/1-hexene copolymer, or an ethylene/1-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the ethylene polymers of this invention, whose typical properties are provided below.

The densities of ethylene-based polymers (e.g., ethylene homopolymers, ethylene copolymers) produced using the catalyst systems and processes disclosed herein often are greater than or equal to about 0.89 g/cm$^3$, for example, greater than or equal to about 0.91 g/cm$^3$, or greater than or equal to about 0.92 g/cm$^3$. Yet, in particular aspects, the density can be in a range from about 0.89 to about 0.97, such as, for example, from about 0.91 to about 0.97, from about 0.91 to about 0.965, from about 0.91 to about 0.94, from about 0.92 to about 0.94, or from about 0.925 to about 0.945 g/cm$^3$. Unexpectedly, ethylene/α-olefin copolymers (e.g., ethylene/1-hexene copolymers) produced using the catalyst systems and polymerization processes described herein can have improved comonomer incorporation, for example, having a decrease in density of at least about 0.008 g/cm$^3$, of at least about 0.01 g/cm$^3$, of at least about 0.015 g/cm$^3$, or of at least about 0.02 g/cm$^3$, and in some instances, up to about 0.025 g/cm$^3$, or up to about 0.035 g/cm$^3$, based on an increase in comonomer:monomer molar ratio (e.g., a 1-hexene:ethylene molar ratio) from 0 (no comonomer) to a comonomer:monomer molar ratio (e.g., a 1-hexene:ethylene molar ratio) of 0.0176:1.

In some aspects, ethylene polymers described herein can have a ratio of Mw/Mn, or the polydispersity index, in a range from about 4 to about 10, from about 4 to about 9, from about 5 to about 10, from about 4.5 to about 9.5, from about 4.5 to about 9, or from about 5 to about 9, and the like.

In an aspect, the polymers described herein can have a ratio of HLMI/MI in a range from about 10 to about 80, such as, for instance, from about 15 to about 75, from about 20 to about 70, from about 20 to about 65, from about 20 to about 60, or from about 25 to about 55, and the like.

Generally, polymers produced in aspects of the present invention are essentially linear or have very low levels of long chain branching, with typically less than about 0.01 long chain branches (LCB) per 1000 total carbon atoms, and similar in LCB content to polymers shown, for example, in U.S. Pat. Nos. 7,517,939, 8,114,946, and 8,383,754, which are incorporated herein by reference in their entirety. In other aspects, the number of LCB per 1000 total carbon atoms can be less than or equal to about 0.008, less than or equal to about 0.007, less than or equal to about 0.005, or less than or equal to about 0.003 LCB per 1000 total carbon atoms.

Ethylene copolymers, for example, produced using the polymerization processes and catalyst systems described hereinabove can, in some aspects, have a conventional comonomer distribution; generally, the higher molecular weight components of the polymer have less comonomer incorporation than the lower molecular weight components. Typically, there is decreasing comonomer incorporation with increasing molecular weight. In one aspect, the number of short chain branches (SCB) per 1000 total carbon atoms of the polymer can be greater at Mn than at Mw. In another aspect, the number of SCB per 1000 total carbon atoms of the polymer can be greater at Mn than at Mz. In yet another aspect, the number of SCB per 1000 total carbon atoms of the polymer can be greater at Mw than at Mz. In still another aspect, the number of SCB per 1000 total carbon atoms of the polymer at a molecular weight of $10^6$ can be less than at a molecular weight of $10^5$.

Olefin polymers, whether homopolymers, copolymers, and so forth, can be formed into various articles of manufacture. Articles which can comprise polymers of this invention include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of ethylene polymers described herein, and the article of manufacture can be a film product or a molded product.

Applicants also contemplate a method for forming or preparing an article of manufacture comprising a polymer produced by any of the polymerization processes disclosed herein. For instance, a method can comprise (i) contacting a catalyst composition with an olefin monomer and an optional olefin comonomer under polymerization conditions in a polymerization reactor system to produce an olefin polymer, wherein the catalyst composition can comprise a half-metallocene titanium compound, an activator-support comprising a solid oxide treated with an electron-withdrawing anion, and an optional co-catalyst (e.g., an organoaluminum compound); and (ii) forming an article of manufacture comprising the olefin polymer. The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Polymer density was determined in grams per cubic centimeter (g/cm$^3$) on a compression molded sample, cooled at about 15° C. per hour, and conditioned for about 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 400 μL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, and Mz is the z-average molecular weight.

SEC-MALS combines the methods of size exclusion chromatography (SEC) with multi-angle light scattering (MALS) detection. A DAWN EOS 18-angle light scattering photometer (Wyatt Technology, Santa Barbara, Calif.) was attached to a PL-210 SEC system (Polymer Labs, now Agilent) or a Waters 150 CV Plus system (Milford, Mass.) through a hot transfer line, thermally controlled at the same temperature as the SEC columns and its differential refractive index (DRI) detector (145° C.). At a flow rate setting of 0.7 mL/min, the mobile phase, 1,2,4-trichlorobenzene (TCB), was eluted through three, 7.5 mm×300 mm, 20 μm Mixed A-LS columns (Polymer Labs, now Agilent). Polyethylene (PE) solutions with concentrations of ~1.2 mg/mL, depending on samples, were prepared at 150° C. for 4 hr before being transferred to the SEC injection vials sitting in a carousel heated at 145° C. For polymers of higher molecular weight, longer heating times were necessary in order to obtain true homogeneous solutions. In addition to acquiring a concentration chromatogram, seventeen light-scattering chromatograms at different angles were also acquired for each injection using Wyatt's Astra® software. At each chromatographic slice, both the absolute molecular weight (M) and root mean square (RMS) radius, also known as radius of gyration (Rg) were obtained from a Debye plot's intercept and slope, respectively. Methods for this process are detailed in Wyatt, P. J., *Anal. Chim. Acta*, 272, 1 (1993), which is incorporated herein by reference in its entirety.

Figure 3:
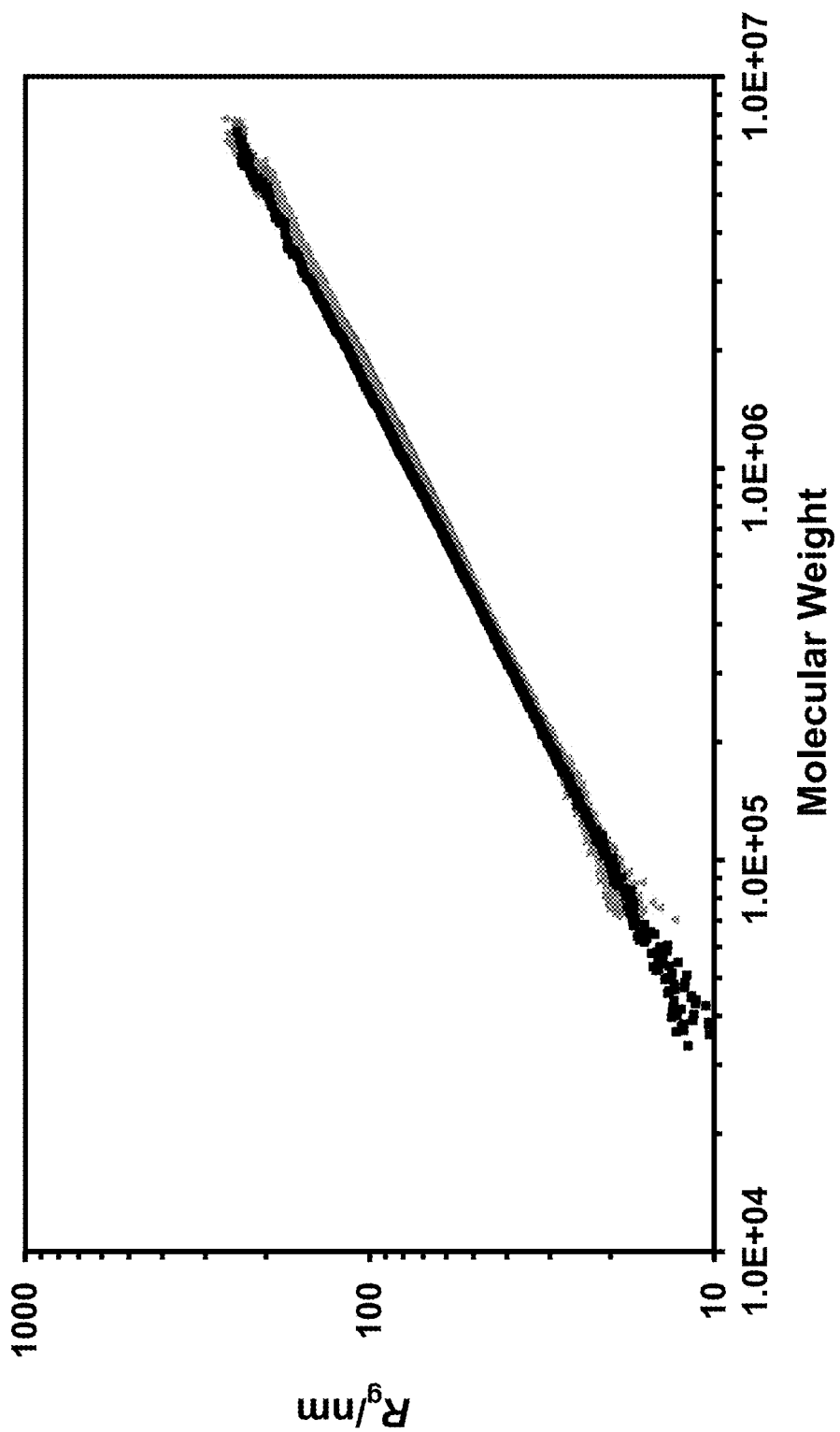
FIG. 3 presents a plot of the radius of gyration versus the molecular weight for a linear standard and polymers produced using the same experimental conditions as Example 6.

The Zimm-Stockmayer approach was used to determine the amount of LCB in FIG. 3. Since SEC-MALS measures M and Rg at each slice of a chromatogram simultaneously, the branching indices, $g_M$, as a function of M could be determined at each slice directly by determining the ratio of the mean square Rg of branched molecules to that of linear ones, at the same M, as shown in following equation (subscripts br and lin represent branched and linear polymers, respectively).

$$g_M = \frac{\langle R_g \rangle_{br}^2}{\langle R_g \rangle_{lin}^2}.$$

At a given $g_M$, the weight-averaged number of LCB per molecule ($B_{3w}$) was computed using Zimm-Stockmayer's equation, shown in the equation below, where the branches were assumed to be trifunctional, or Y-shaped.

$$g_M = \frac{6}{B_{3w}} \left\{ \frac{1}{2} \left( \frac{2 + B_{3w}}{B_{3w}} \right)^{1/2} \ln\left[ \frac{(2+B_{3w})^{1/2} + (B_{3w})^{1/2}}{(2+B_{3w})^{1/2} - (B_{3w})^{1/2}} \right] - 1 \right\}.$$

LCB frequency ($LCB_{Mi}$), the number of LCB per 1000 C, of the i$^{th}$ slice was then computed straightforwardly using the following equation ($M_i$ is the MW of the i$^{th}$ slice):

$$LCB_{Mi} = 1\,000 * 14 * B_{3w}/M_i.$$

The LCB distribution (LCBD) across the molecular weight distribution (MWD) was thus established for a full polymer.

Short chain branch (SCB) content and short chain branching distribution (SCBD) across the molecular weight distribution were determined via an IR5-detected GPC system (IR5-GPC), wherein the GPC system was a PL220 GPC/SEC system (Polymer Labs, an Agilent company) equipped with three Styragel HMW-6E columns (Waters, MA) for polymer separation. A thermoelectric-cooled IR5 MCT detector (IR5) (Polymer Char, Spain) was connected to the GPC columns via a hot-transfer line. Chromatographic data were obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a broad MWD HDPE Marlex™ BHB5003 resin (Chevron Phillips Chemical) as the broad molecular weight standard. The digital signals, on the other hand, go via a USB cable directly to Computer "B" where they are collected by a LabView data collection software provided by Polymer Char. Chromatographic conditions were set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell were set at 150° C., while the temperature of the electronics of the IR5 detector was set at 60° C. Short chain branching content was determined via an in-house method using the intensity ratio of $CH_3$ ($I_{CH3}$) to $CH_2$ ($I_{CH2}$) coupled with a calibration curve. The calibration curve was a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) were used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution were obtained for resins fractionated by the IR5-GPC system under exactly the same chromatographic conditions as for these SCB standards. A relationship between the intensity ratio and the elution volume was converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: |η*(ω)|=magnitude of complex shear viscosity;
$\eta_0$=zero shear viscosity;
$\tau_\eta$=viscous relaxation time (Tau(η));
a="breadth" parameter (CY-a parameter);
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

Figure 4:
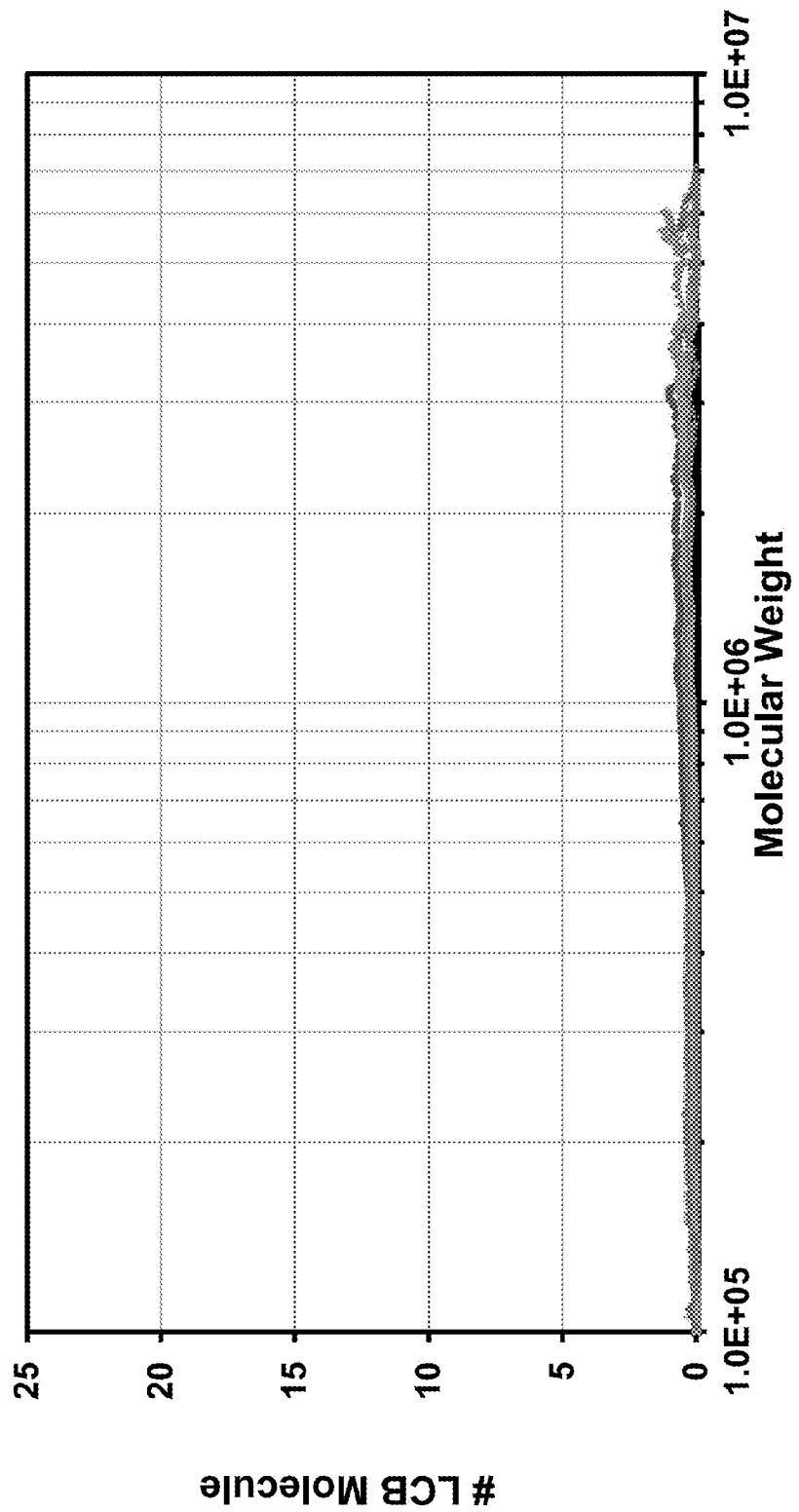
FIG. 4 presents a plot of the amount of long chain branches (LCB) per 1,000,000 total carbon atoms as a function of the molecular weight of polymers produced using the same experimental conditions as Example 6.

The long chain branches (LCB) per 1,000,000 total carbon atoms of FIG. 4 were calculated using the method of Janzen and Colby (*J. Mol. Struct.*, 485/486, 569-584 (1999)), from values of zero shear viscosity, $\eta_o$ (determined from the Carreau-Yasuda model), and measured values of Mw obtained using a Dawn EOS multiangle light scattering detector (Wyatt). See also U.S. Pat. No. 8,114,946; J. Phys. Chem. 1980, 84, 649; and Y. Yu, D. C. Rohlfing, G. R Hawley, and P. J. DesLauriers, *Polymer Preprint*, 44, 50, (2003). These references are incorporated herein by reference in their entirety.

Fluorided silica-coated alumina activator-supports were prepared as follows. Bohemite was obtained from W.R. Grace & Company under the designation "Alumina A" and having a surface area of about 300 m$^2$/g, a pore volume of about 1.3 mL/g, and an average particle size of about 100 microns. The alumina was first calcined in dry air at about 600° C. for approximately 6 hours, cooled to ambient temperature, and then contacted with tetraethylorthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina (FSCA) was collected and stored under dry nitrogen, and was used without exposure to the atmosphere.

Examples 1-22 were produced using the following polymerization procedure (Table I and Table II summarizes certain information relating to the polymerization experiments of Examples 1-22). The polymerization runs were conducted in a 2.2-L stainless steel reactor, and isobutane (1.2 L) was used in all runs. Solutions of the half-metallocene compounds and the metallocene compounds were prepared at about 1 mg/mL in toluene. The activator-support (fluorided silica-coated alumina, FSCA), triisobutylaluminum (TIBA), and the half-metallocene solution and/or metallocene solution were added in that order through a charge port while slowly venting isobutane vapor. The charge port was closed and isobutane was added. The contents of the reactor were stirred and heated to the desired run temperature of 80° C., and ethylene was then introduced into the reactor with 1-hexene (grams) and hydrogen (based on ppm by weight of the ethylene) as indicated in Table I and Table II. Ethylene and hydrogen were fed on demand at the specified weight ratio to maintain the target pressure of 340 psig pressure for the specified length of the polymerization run. The reactor was maintained at the desired run temperature throughout the run by an automated heating-cooling system. The following half-metallocene titanium compounds and metallocene compounds were used in Examples 1-22 (tBu=tert-butyl; Me=methyl; Ph=phenyl):

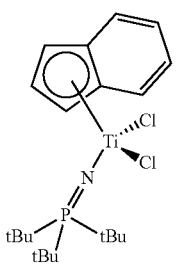

TP1

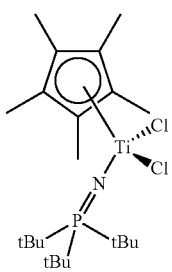

TP2

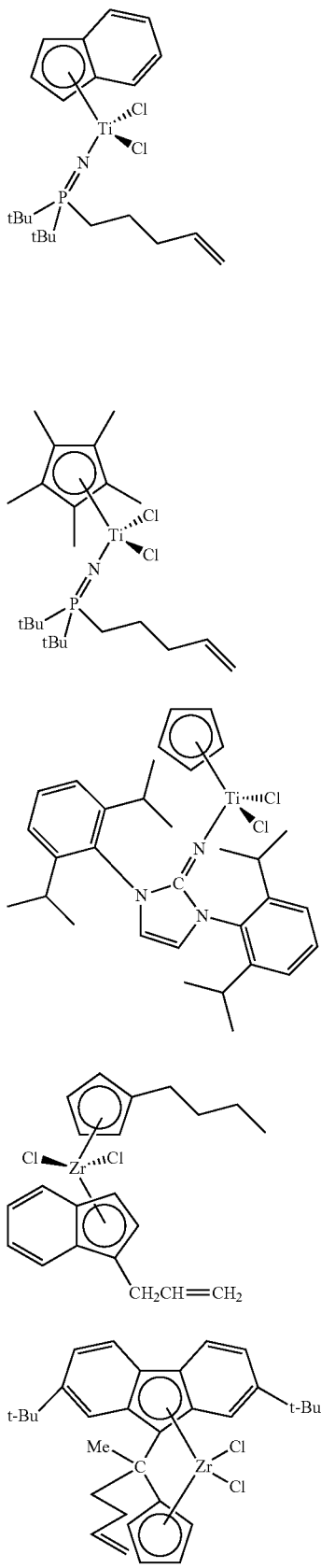

Examples 1-22

As shown in Table I, the catalyst compositions used in Examples 1-14 employed a half-metallocene titanium compound, and the polymerization processes utilized various amounts of hydrogen and 1-hexene comonomer. Catalyst activities were relatively high, ranging from about 50 to about 550 kg of polymer produced per gram of the half-metallocene titanium per hour. For the polymers of Examples 1-8 in which analytical testing was performed, as shown in Table III, the ratios of HLMI/MI ranged from about 27 to about 53, and the ratios of Mw/Mn ranged from about 4.8 to about 9.1. FIG. 1 illustrates the molecular weight distributions (amount of polymer versus the logarithm of molecular weight) for the polymers of Example 4, Example C2, and Example C3. Unexpectedly, the polymer produced using the half-metallocene titanium compound had a broad molecular weight distribution, more similar to a traditional Ziegler catalyst than a traditional metallocene catalyst. Despite the relatively broad molecular weight distribution, the half-metallocene titanium catalyst was surprisingly sensitive to the addition of hydrogen (see e.g., Examples 1 and 4 versus Examples 2 and 5), more similar to a traditional metallocene catalyst than a traditional Ziegler catalyst. Additionally, catalyst systems utilizing the half-metallocene titanium compound were efficient incorporators of comonomer, as evidenced by the sharp decrease in density as the addition of 1-hexene comonomer was increased (see Table I and Table III).

Figure 2:
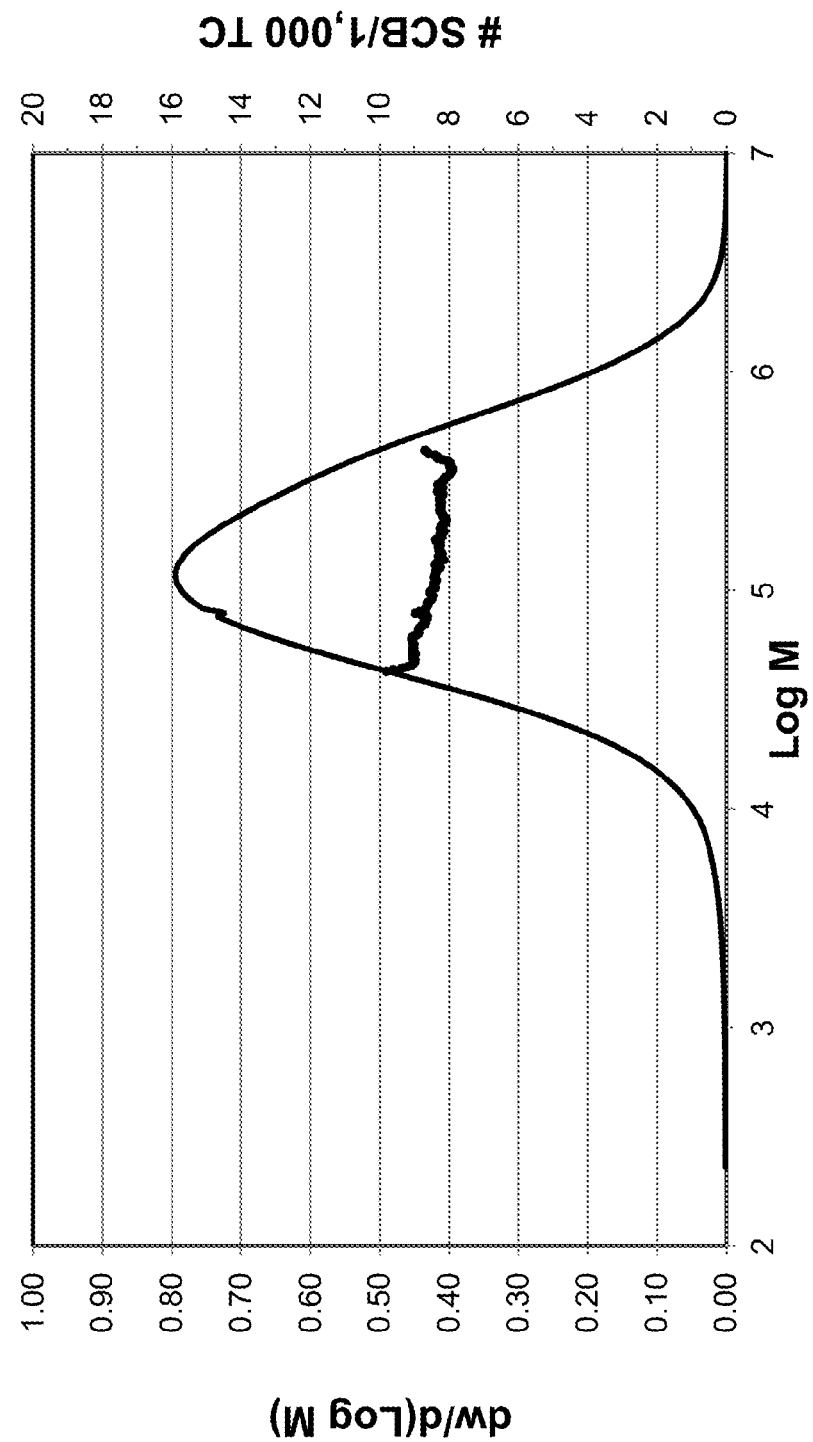
FIG. 2 presents a plot of the short chain branch distribution of a polymer produced using the same experimental conditions as Example 2.

FIG. 2 illustrates the broad MWD characteristics of a polymer produced using the same experimental conditions as Example 2, as well as, unexpectedly, the generally decreasing number of SCB's as molecular weight increases. FIG. 3 illustrates the low levels of LCB of the polymers produced using the half-metallocene titanium compound. The radius of gyration versus the logarithm of the molecular weight for a linear standard and polymers produced using the same experimental conditions as Example 6, with data from SEC-MALS, is provided in FIG. 3. These polymers were substantially linear with minimal amounts of LCB, e.g., less than about 0.01 LCB, or less than about 0.008 LCB, etc., per 1000 total carbon atoms in the 200,000 to 5,000,000 g/mol molecular weight range, or in the 500,000 to 2,000,000 g/mol molecular weight range, of the polymer. The very low levels of long chain branches (LCB), i.e., less than 5 per 1,000,000 total carbon atoms (or less than 2 per 1,000,000 total carbon atoms) also is illustrated in FIG. 4, which shows the very low amount of LCB of polymers produced using the same experimental conditions as Example 6 as a function of the polymer molecular weight.

As shown in Table II and Table III, the dual catalyst compositions used in Examples 15-20 employed a half-metallocene titanium compound and a bridged or unbridged metallocene compound, and the polymerization processes utilized various amounts of hydrogen and 1-hexene comonomer. Unlike Ziegler catalysts in combination with traditional metallocenes, Examples 15-20 demonstrated unexpectedly high catalyst productivity, and produced polymers having a wide range of melt flow, density, and molecular weight characteristics.

Figure 5:
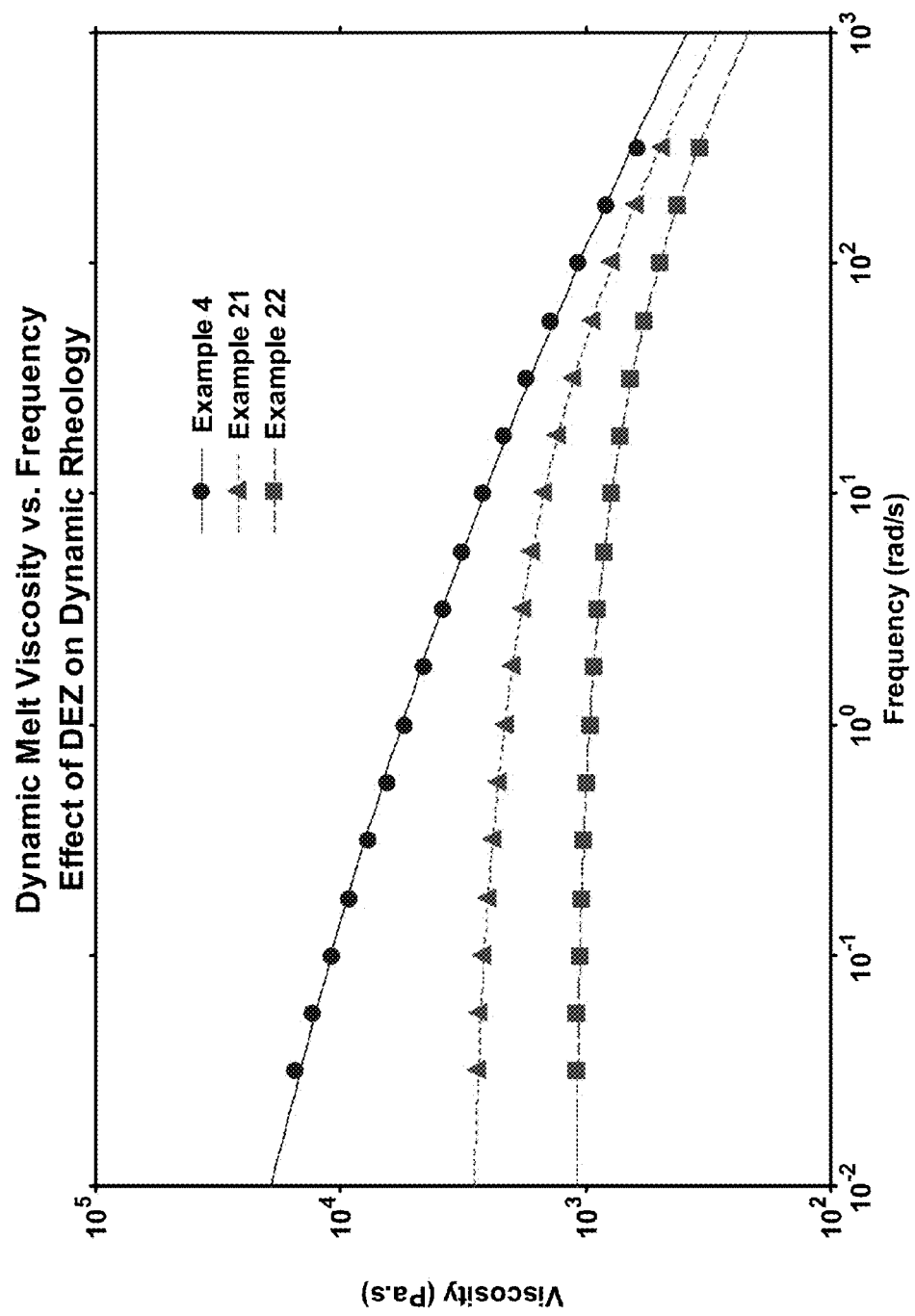
FIG. 5 presents a dynamic rheology plot (viscosity versus frequency) at 190° C. for the polymers of Examples 4 and 21-22, produced using different amounts of diethylzinc (DEZ).
Figure 6:
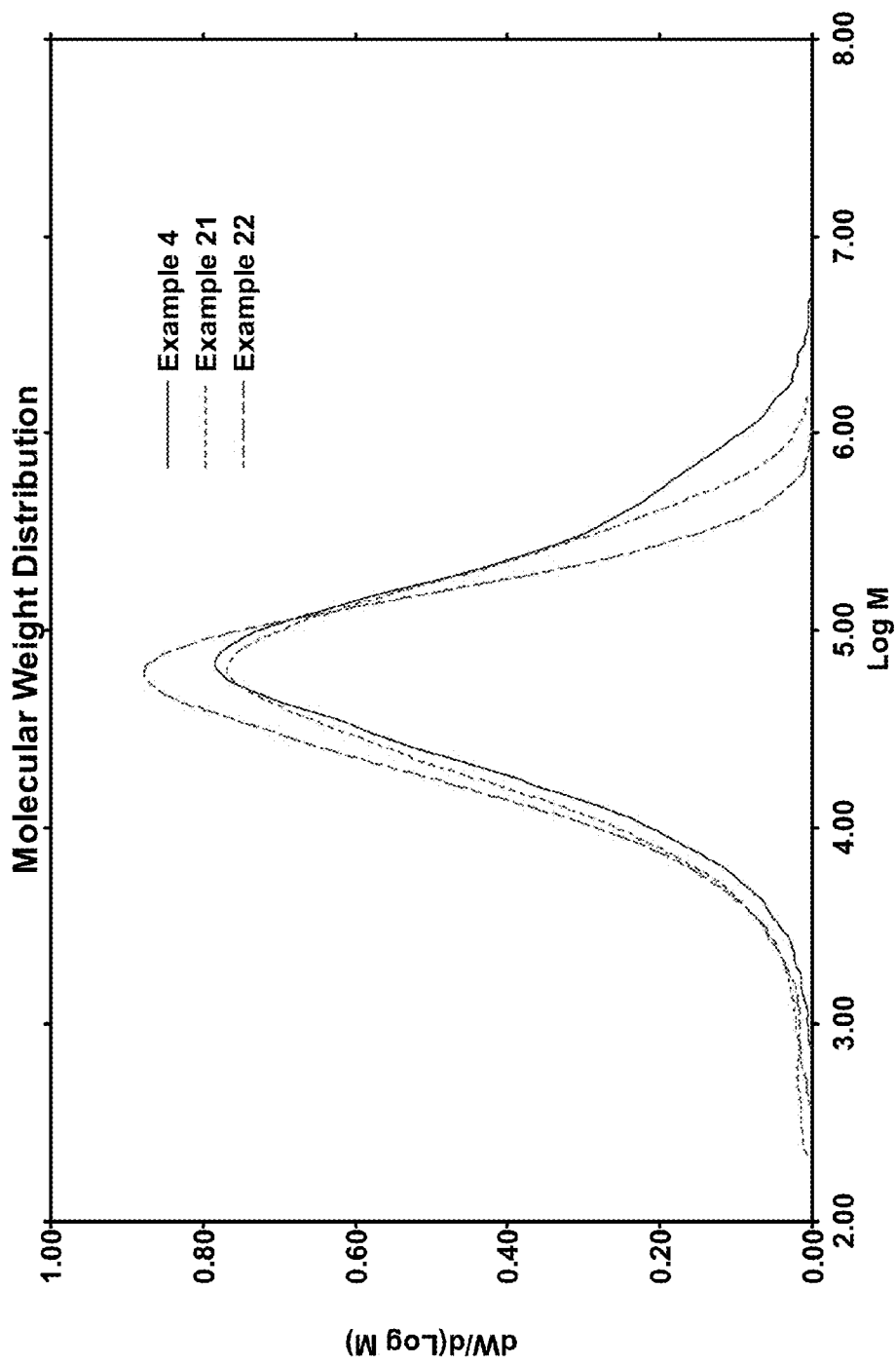
FIG. 6 presents a plot of the molecular weight distributions of the polymers of Examples 4 and 21-22, produced using different amounts of diethylzinc (DEZ).

Examples 21-22 were conducted by adding diethylzinc (DEZ) along with TIBA to the initial reactor charge. Unexpectedly, as shown by Table III, the dynamic rheology properties at 190° C. in FIG. 5, and the molecular weight distributions in FIG. 6, the addition of DEZ reduced the Mz and the ratio of Mw/Mn of the polymer.

Comparative Examples C1-C4 are shown in Table II and respective polymers properties for C2-C4 are shown Table III. C1 used a catalyst composition containing a half-metallocene titanium compound and MAO in toluene; this catalyst system resulted in reactor inoperability due to reactor fouling. C2 employed a representative bridged metallocene based catalyst system, and resulted in a narrow molecular weight distribution polymer (Mw/Mn of 2.2). C3 was representative Ziegler catalyst system with triethylaluminum, containing di-n-butyl magnesium and $TiCl_4$ (Mg:Ti>2:1), and C4 was a representative Ziegler catalyst system with triethylaluminum, containing a prepolymerized titanium/magnesium catalyst.

TABLE I

Examples 1-14.

| Example | Catalyst Composition | 1-hexene (g) | $H_2$ (ppm) | Time (min) | Polymer (g) | Activity (kg/g/hr) |
|---|---|---|---|---|---|---|
| 1 | 2 mg TP1/109 mg FSCA/0.5 mmol TIBA | 0 | 150 | 17 | 162 | 286 |
| 2 | 2 mg TP1/116 mg FSCA/0.5 mmol TIBA | 0 | 0 | 20 | 297 | 456 |
| 3 | 2 mg TP1/112 mg FSCA/0.5 mmol TIBA | 10 | 150 | 20 | 139 | 209 |
| 4 | 2 mg TP1/100 mg FSCA/0.5 mmol TIBA | 20 | 150 | 20 | 144 | 216 |
| 5 | 1 mg TP1/61 mg FSCA/0.25 mmol TIBA | 20 | 0 | 22 | 202 | 551 |
| 6 | 2 mg TP1/99 mg FSCA/0.5 mmol TIBA | 30 | 150 | 17 | 156 | 275 |
| 7 | 2 mg TP1/91 mg FSCA/0.5 mmol TIBA | 20 | 150 | 4 | 34 | 255 |
| 8 | 2 mg TP1/90 mg FSCA/0.5 mmol TIBA | 20 | 150 | 5 | 35 | 210 |
| 9 | 2 mg TP2/103 mg FSCA/0.5 mmol TIBA | 0 | 150 | 30 | 188 | 188 |
| 10 | 1.5 mg TC1/157 mg FSCA/0.5 mmol TIBA | 20 | 0 | 20 | 163 | 326 |
| 11 | 3 mg TP3/38 mg FSCA/0.5 mmol TIBA | 0 | 0 | 25 | 106 | 85 |
| 12 | 3 mg TP3/37 mg FSCA/0.5 mmol TIBA | 20 | 0 | 30 | 87 | 58 |
| 13 | 3 mg TP4/37 mg FSCA/0.5 mmol TIBA | 0 | 0 | 24 | 107 | 89 |
| 14 | 3 mg TP4/37 mg FSCA/0.5 mmol TIBA | 20 | 0 | 15 | 125 | 167 |

TABLE II

Examples 15-22 and Comparative Examples C1-C4.

| Example | Catalyst Composition | 1-hexene (g) | $H_2$ (ppm) | Time (min) | Polymer (g) | Activity (kg/g/hr) |
|---|---|---|---|---|---|---|
| 15 | 0.5 mg TP1/1 mg MET1/97 mg FSCA/0.5 mmol TIBA | 0 | 150 | 20 | 166 | 332 |
| 16 | 0.5 mg TP1/1 mg MET1/97 mg FSCA/0.5 mmol TIBA | 20 | 150 | 18 | 172 | 382 |
| 17 | 0.5 mg TP1/1 mg MET2/91 mg FSCA/0.5 mmol TIBA | 0 | 400 | 20 | 164 | 328 |
| 18 | 0.5 mg TP1/1 mg MET2/93 mg FSCA/0.5 mmol TIBA | 20 | 400 | 22 | 184 | 335 |
| 19 | 0.5 mg TP1/1 mg MET3/93 mg FSCA/0.5 mmol TIBA | 0 | 150 | 22 | 103 | 187 |
| 20 | 0.5 mg TP1/1 mg MET3/101 mg FSCA/0.5 mmol TIBA | 20 | 150 | 15 | 76 | 203 |
| 21 | 1.5 mg TP1/79 mg FSCA/0.5 mmol TIBA/0.5 mmol DEZ | 20 | 150 | 20 | 163 | 326 |
| 22 | 1.5 mg TP1/81 mg FSCA/0.5 mmol TIBA/3.0 mmol DEZ | 20 | 150 | 27 | 113 | 167 |
| C1 | 0.25 mg TP1/1 mL 10% MAO in toluene | 20 | 0 | 21 | Fouled | Fouled |
| C2 | 3 mg MET2/44 mg FSCA/0.5 mmol TIBA | 20 | 0 | 45 | 126 | 56 |
| C3 | 6 mg Ziegler1/0.5 mmol TEA | 80 | $25^a$ | 28 | 124 | 44 |
| C4 | 2 mg Ziegler2/0.5 mmol TEA | 20 | $40^a$ | 10 | 174 | 522 |

$^a$Hydrogen addition listed for C3 and C4 is the ΔP from a 300 mL storage vessel (psig).

TABLE III

Examples 1-8, 15-22, and C2-C4 - Polymer Characterization

| Example | MI (g/10 min) | HLMI (g/10 min) | HLMI/MI | Density (g/cc) | Mn/1000 (g/mol) | Mw/1000 (g/mol) | Mz/1000 (g/mol) | Mw/Mn |
|---|---|---|---|---|---|---|---|---|
| 1 | 0.04 | 2.1 | 52.5 | 0.9552 | 45.7 | 316.7 | 888 | 6.9 |
| 2 | 0 | 0 | — | — | — | — | — | — |
| 3 | 2.0 | 63.4 | 31.7 | 0.9472 | 29.0 | 155.8 | 702 | 5.4 |
| 4 | 1.8 | 66.7 | 37.1 | 0.9393 | 32.2 | 154.3 | 502 | 4.8 |
| 5 | 0 | 0 | — | — | — | — | — | — |
| 6 | 1.5 | 56.1 | 37.4 | 0.9325 | 28.1 | 163.5 | 509 | 5.8 |
| 7 | 0.7 | 33.4 | 47.7 | 0.9278 | 15.7 | 143.0 | 398 | 9.1 |
| 8 | 3.3 | 91.2 | 27.6 | 0.9245 | 20.5 | 115.4 | 784 | 5.6 |
| 15 | 2.4 | 79.0 | 32.9 | 0.9638 | 21.8 | 102.9 | 319 | 4.7 |
| 16 | 4.9 | 157.3 | 32.1 | 0.9452 | 19.0 | 96.4 | 420 | 5.1 |
| 17 | 1.7 | 146.0 | 85.9 | 0.9592 | 5.0 | 115.4 | 376 | 23.1 |
| 18 | 3.2 | 193.8 | 60.6 | 0.9321 | 6.7 | 95.1 | 252 | 14.2 |
| 19 | 0.6 | 22.4 | 37.3 | 0.9623 | 25.2 | 222.6 | 1757 | 8.8 |
| 20 | 1.2 | 69.1 | 57.6 | 0.9384 | 18.4 | 184.6 | 1345 | 10.0 |
| 21 | 3.5 | 96.6 | 27.6 | 0.9411 | 14.8 | 101.4 | 281 | 6.8 |
| 22 | 8.5 | 184.0 | 21.6 | 0.9457 | 18.8 | 73.4 | 163 | 3.9 |
| C2 | 0.07 | 1.6 | 22.9 | 0.9207 | 122.9 | 269.7 | 505 | 2.2 |
| C3 | 2 | 77.0 | 40.5 | 0.9343 | 12.3 | 118.7 | 460 | 9.7 |
| C4 | 0.1 | 2.1 | 35.0 | 0.9403 | 72.9 | 285.6 | 814 | 3.9 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A catalyst composition comprising any half-metallocene titanium compound disclosed herein, any activator-support disclosed herein, and optionally, any co-catalyst disclosed herein, wherein the half-metallocene titanium compound has the formula:

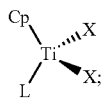
(I)

wherein:
Cp is any cyclopentadienyl, indenyl, or fluorenyl group disclosed herein;
each X independently is any monoanionic ligand disclosed herein; and
L is any phosphinimide or iminoimidazolidide ligand disclosed herein.

Embodiment 2

The composition defined in embodiment 1, wherein the activator-support comprises any solid oxide disclosed herein treated with any electron-withdrawing anion disclosed herein.

Embodiment 3

The composition defined in embodiment 1, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 4

The composition defined in embodiment 1, wherein the activator-support comprises a fluorided solid oxide, e.g., fluorided alumina, fluorided silica-alumina, fluorided silica-coated alumina, etc., or any combination thereof.

Embodiment 5

The composition defined in embodiment 1, wherein the activator-support comprises a sulfated solid oxide, e.g., sulfated alumina, sulfated silica-alumina, sulfated silica-coated alumina, etc., or any combination thereof.

Embodiment 6

The composition defined in any one of embodiments 1-5, wherein the activator-support further comprises any metal or metal ion disclosed herein, e.g., zinc, nickel, vanadium, titanium, silver, copper, gallium, tin, tungsten, molybdenum, zirconium, etc., or any combination thereof.

Embodiment 7

The composition defined in any one of embodiments 1-6, wherein the catalyst composition comprises a co-catalyst, e.g., any co-catalyst disclosed herein.

Embodiment 8

The composition defined in any one of embodiments 1-7, wherein the co-catalyst comprises any organoaluminum compound disclosed herein.

Embodiment 9

The composition defined in embodiment 8, wherein the organoaluminum compound comprises trimethylaluminum, triethylaluminum, triisobutylaluminum, or a combination thereof.

Embodiment 10

The composition defined in any one of embodiments 1-9, wherein the catalyst composition is substantially free of aluminoxane compounds, organoboron or organoborate compounds, ionizing ionic compounds, or combinations thereof.

Embodiment 11

The composition defined in any one of embodiments 1-10, wherein the catalyst composition is produced by a process comprising contacting, in any order, the titanium compound having formula (I), the activator-support, and the co-catalyst (if used).

Embodiment 12

The composition defined in any one of embodiments 1-11, wherein the half-metallocene titanium compound having formula (I) has the structure of formula (II):

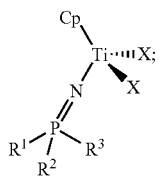

(II)

wherein:
Cp is any cyclopentadienyl, indenyl, or fluorenyl group disclosed herein;
each X independently is any monoanionic ligand disclosed herein; and
$R^1$, $R^2$, and $R^3$ independently are H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein.

Embodiment 13

The composition defined in embodiment 12, wherein $R^1$, $R^2$, and $R^3$ independently are H or a $C_1$ to $C_{18}$ hydrocarbyl group.

Embodiment 14

The composition defined in embodiment 12, wherein at least one of $R^1$, $R^2$, and $R^3$ is a $C_3$ to $C_{12}$ alkenyl group.

Embodiment 15

The composition defined in embodiment 12, wherein $R^1$, $R^2$, and $R^3$ independently are H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a 2,6-diisopropylphenyl group, a tolyl group, a benzyl group, a naphthyl group, a trimethylsilyl group, a triisopropylsilyl group, a triphenylsilyl group, or an allyldimethylsilyl group.

Embodiment 16

The composition defined in any one of embodiments 1-11, wherein the half-metallocene titanium compound having formula (I) has the structure of formula (III):

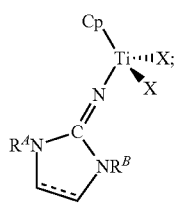

(III)

wherein:
Cp is any cyclopentadienyl, indenyl, or fluorenyl group disclosed herein;
each X independently is any monoanionic ligand disclosed herein; and
$R^A$ and $R^B$ independently are H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein.

Embodiment 17

The composition defined in embodiment 16, wherein $R^A$ and $R^B$ independently are H or a $C_1$ to $C_{18}$ hydrocarbyl group.

Embodiment 18

The composition defined in embodiment 16, wherein $R^A$ and $R^B$ independently are H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a 2,6-diisopropylphenyl group, a tolyl group, a benzyl group, a naphthyl group, a trimethylsilyl group, a triisopropylsilyl group, a triphenylsilyl group, or an allyldimethylsilyl group.

Embodiment 19

The composition defined in any one of embodiments 16-18, wherein the heterocyclic carbene group is unsaturated.

Embodiment 20

The composition defined in any one of embodiments 1-19, wherein each X independently is H, $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, $OBR^X_2$, or $OSO_2R^X$, wherein $R^X$ is a $C_1$ to $C_{36}$ hydrocarbyl group.

Embodiment 21

The composition defined in any one of embodiments 1-20, wherein each X independently is any halide (e.g., Cl) or $C_1$ to $C_{18}$ hydrocarbyl group (e.g., benzyl) disclosed herein.

Embodiment 22

The composition defined in any one of embodiments 1-21, wherein each X independently is Cl, methyl, phenyl, or benzyl.

Embodiment 23

The composition defined in any one of embodiments 1-22, wherein Cp is an unsubstituted cyclopentadienyl, indenyl, or fluorenyl group.

Embodiment 24

The composition defined in any one of embodiments 1-23, wherein Cp is an unsubstituted indenyl group.

Embodiment 25

The composition defined in any one of embodiments 1-22, wherein Cp is a substituted cyclopentadienyl, indenyl, or fluorenyl group.

Embodiment 26

The composition defined in embodiment 25, wherein each (one or more) substituent on the substituted cyclopentadienyl, indenyl, or fluorenyl group independently is H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group.

Embodiment 27

The composition defined in embodiment 25, wherein each (one or more) substituent on the substituted cyclopentadienyl, indenyl, or fluorenyl group independently is H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a 2,6-diisopropylphenyl group, a tolyl group, a benzyl group, a naphthyl group, a trimethylsilyl group, a triisopropylsilyl group, a triphenylsilyl group, or an allyldimethylsilyl group.

Embodiment 28

The composition defined in any one of embodiments 1-27, wherein a catalyst activity of the catalyst composition is in any range disclosed herein, e.g., from about 25,000 to about 750,000, from about 50,000 to about 500,000, from about 100,000 to about 400,000 grams, etc., of ethylene polymer per gram of half-metallocene titanium compound per hour, under slurry polymerization conditions, with a triisobutylaluminum co-catalyst, using isobutane as a diluent, and with a polymerization temperature of 80° C. and a reactor pressure of 340 psig.

Embodiment 29

The composition defined in any one of embodiments 1-28, wherein the catalyst composition further comprises any bridged metallocene compound disclosed herein.

Embodiment 30

The composition defined in any one of embodiments 1-28, wherein the catalyst composition further comprises any single atom bridged metallocene compound with a fluorenyl group disclosed herein.

Embodiment 31

The composition defined in any one of embodiments 1-28, wherein the catalyst composition further comprises any bridged metallocene compound with an alkenyl substituent disclosed herein.

Embodiment 32

The composition defined in any one of embodiments 1-28, wherein the catalyst composition further comprises any unbridged metallocene compound disclosed herein.

Embodiment 33

The composition defined in any one of embodiments 1-28, wherein the catalyst composition further comprises any unbridged metallocene with a cyclopentadienyl group and an indenyl group disclosed herein.

Embodiment 34

The composition defined in any one of embodiments 1-28, wherein the catalyst composition further comprises any unbridged metallocene compound with an alkenyl substituent disclosed herein.

Embodiment 35

The composition defined in any one of embodiments 29-34, wherein a weight ratio of the half-metallocene titanium compound to the bridged metallocene compound (or to the unbridged metallocene compound) in the catalyst composition is in any range of weight ratios disclosed herein, e.g., from about 1:10 to about 10:1, from about 3:1 to about 1:3, from about 1.5:1 to about 1:1.5, etc.

Embodiment 36

An olefin polymerization process, the process comprising contacting the catalyst composition defined in any one of embodiments 1-35 with an olefin monomer and an optional olefin comonomer in a polymerization reactor system under polymerization conditions to produce an olefin polymer.

Embodiment 37

The process defined in embodiment 36, wherein the olefin monomer comprises any olefin monomer disclosed herein, e.g., any $C_2$-$C_{20}$ olefin. Embodiment 38. The process defined in embodiment 36 or 37, wherein the olefin monomer and the optional olefin comonomer independently comprise a $C_2$-$C_{20}$ alpha-olefin.

Embodiment 39

The process defined in any one of embodiments 36-38, wherein the olefin monomer comprises ethylene.

Embodiment 40

The process defined in any one of embodiments 36-39, wherein the catalyst composition is contacted with ethylene and an olefin comonomer comprising a $C_3$-$C_{10}$ alpha-olefin.

Embodiment 41

The process defined in any one of embodiments 36-40, wherein the catalyst composition is contacted with ethylene and an olefin comonomer comprising 1-butene, 1-hexene, 1-octene, or a mixture thereof.

Embodiment 42

The process defined in any one of embodiments 36-38, wherein the olefin monomer comprises propylene.

Embodiment 43

The process defined in any one of embodiments 36-42, wherein the polymerization reactor system comprises a batch reactor, a slurry reactor, a gas-phase reactor, a solution reactor, a high pressure reactor, a tubular reactor, an autoclave reactor, or a combination thereof.

Embodiment 44

The process defined in any one of embodiments 36-43, wherein the polymerization reactor system comprises a slurry reactor, a gas-phase reactor, a solution reactor, or a combination thereof.

Embodiment 45

The process defined in any one of embodiments 36-44, wherein the polymerization reactor system comprises a slurry reactor.

Embodiment 46

The process defined in any one of embodiments 36-45, wherein the polymerization reactor system comprises a loop slurry reactor.

Embodiment 47

The process defined in any one of embodiments 36-46, wherein the polymerization reactor system comprises a single reactor.

Embodiment 48

The process defined in any one of embodiments 36-46, wherein the polymerization reactor system comprises 2 reactors.

Embodiment 49

The process defined in any one of embodiments 36-46, wherein the polymerization reactor system comprises more than 2 reactors.

Embodiment 50

The process defined in any one of embodiments 36-49, wherein the olefin polymer comprises any olefin polymer disclosed herein.

Embodiment 51

The process defined in any one of embodiments 36-41 and 43-50, wherein the olefin polymer is an ethylene homopolymer, an ethylene/1-butene copolymer, an ethylene/1-hexene copolymer, or an ethylene/1-octene copolymer.

Embodiment 52

The process defined in any one of embodiments 36-41 and 43-51, wherein the olefin polymer is an ethylene/1-hexene copolymer.

Embodiment 53

The process defined in any one of embodiments 36-38 and 42-50, wherein the olefin polymer is a polypropylene homopolymer or a propylene-based copolymer.

Embodiment 54

The process defined in any one of embodiments 36-53, wherein the polymerization conditions comprise a polymerization reaction temperature in a range from about 60° C. to about 120° C. and a reaction pressure in a range from about 200 to about 1000 psig (about 1.4 to about 6.9 MPa).

Embodiment 55

The process defined in any one of embodiments 36-54, wherein the polymerization conditions comprise a polymerization reaction temperature in a range from about 65° C. to about 110° C., from about 70° C. to about 100° C., or from about 70° C. to about 95° C.

Embodiment 56

The process defined in any one of embodiments 36-55, wherein the polymerization conditions are substantially constant, e.g., for a particular polymer grade.

Embodiment 57

The process defined in any one of embodiments 36-56, wherein no hydrogen is added to the polymerization reactor system.

Embodiment 58

The process defined in any one of embodiments 36-56, wherein hydrogen is added to the polymerization reactor system.

Embodiment 59

The process defined in embodiment 58, wherein the olefin polymer (e.g., an ethylene/1-hexene copolymer) has an increase in melt index in any range disclosed herein, based on an increase in hydrogen:monomer weight ratio (e.g., hydrogen:ethylene weight ratio) from 0 to 150 ppmw, e.g., an increase of at least about 1 g/10 min (up to about 3-5 g/10 min), at least about 1.2 g/10 min, at least about 1.5 g/10 min, at least about 2 g/10 min, etc.

Embodiment 60

The process defined in any one of embodiments 36-59, wherein an organozinc compound is added to the polymerization reactor system.

Embodiment 61

The process defined in embodiment 60, wherein the organozinc compound comprises diethylzinc.

Embodiment 62

The process defined in embodiment 60 or 61, wherein the addition of the organozinc compound reduces the Mw/Mn of the olefin polymer.

Embodiment 63

The process defined in any one of embodiments 60-62, wherein the addition of the organozinc compound reduces the z-average molecular weight (Mz) of the olefin polymer.

Embodiment 64

The process defined in any one of embodiments 36-63, wherein the olefin polymer (e.g., an ethylene/1-hexene copolymer) has a decrease in density in any range disclosed herein, based on an increase in comonomer:monomer molar ratio (e.g., 1-hexene:ethylene molar ratio) from 0 to 0.0176, e.g., a decrease in density of at least about 0.008 g/cm$^3$ (up to about 0.025-0.035 g/cm$^3$), at least about 0.01 g/cm$^3$, at least about 0.015 g/cm$^3$, at least about 0.02 g/cm$^3$, etc.

Embodiment 65

The process defined in any one of embodiments 36-64, wherein the olefin polymer has a ratio of Mw/Mn in any range disclosed herein, e.g., from about 4 to about 10, from about 4 to about 9, from about 5 to about 10, from about 4.5 to about 9.5, from about 5 to about 9, etc.

Embodiment 66

The process defined in any one of embodiments 36-65, wherein the olefin polymer has a ratio of HLMI/MI in any range disclosed herein, e.g., from about 15 to about 75, from about 20 to about 70, from about 20 to about 65, from about 20 to about 60, from about 25 to about 55, etc.

Embodiment 67

The process defined in any one of embodiments 36-66, wherein the olefin polymer has a density in any range disclosed herein, e.g., from about 0.89 to about 0.97, from about 0.91 to about 0.965, from about 0.91 to about 0.94, from about 0.92 to about 0.94 g/cm$^3$, etc.

Embodiment 68

The process defined in any one of embodiments 36-67, wherein the olefin polymer has a conventional comonomer distribution, e.g., the number of short chain branches (SCB) per 1000 total carbon atoms of the polymer at Mn is greater than at Mz, the number of SCB per 1000 total carbon atoms at Mn is greater than at Mw, etc.

Embodiment 69

The process defined in any one of embodiments 36-68, wherein the olefin polymer has less than or equal to about 0.008 long chain branches (LCB) per 1000 total carbon atoms, e.g., less than or equal to about 0.005 LCB, less than or equal to about 0.003 LCB, etc.

Embodiment 70

An olefin polymer produced by the polymerization process defined in any one of embodiments 36-69.

Embodiment 71

An article comprising the olefin polymer defined in embodiment 70.

Embodiment 72

A method or forming or preparing an article of manufacture comprising an olefin polymer, the method comprising (i) performing the olefin polymerization process defined in any one of embodiments 36-69 to produce the olefin polymer, and (ii) forming the article of manufacture comprising the olefin polymer, e.g., via any technique disclosed herein.

Embodiment 73

The article defined in embodiment 71 or 72, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. An olefin polymerization process, the process comprising:
contacting a catalyst composition with an olefin monomer and an optional olefin comonomer in a polymerization reactor system under polymerization conditions to produce an olefin polymer, wherein the catalyst composition comprises:
(i) a half-metallocene titanium compound;
(ii) an activator-support comprising a solid oxide treated with an electron-withdrawing anion; and
(iii) an optional co-catalyst;
wherein the half-metallocene titanium compound has the formula:

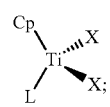

(I)

wherein:
Cp is a cyclopentadienyl, indenyl, or fluorenyl group;
each X independently is a monoanionic ligand; and
L is a iminoimidazolidide ligand; and
wherein the olefin polymer has less than or equal to about 0.008 long chain branches (LCB) per 1000 total carbon atoms.

2. The process of claim 1, wherein:
the catalyst composition comprises an organoaluminum co-catalyst; and
the activator-support comprises a fluorided solid oxide and/or a sulfated solid oxide.

3. The process of claim 1, wherein the polymerization reactor system comprises a slurry reactor, gas-phase reactor, solution reactor, or a combination thereof.

4. The process of claim 1, wherein the olefin monomer comprises ethylene or propylene.

5. The process of claim 1, wherein:
the catalyst composition comprises an organoaluminum co-catalyst comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof; and
the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

6. The process of claim 1, wherein:
the catalyst composition is contacted with ethylene and an olefin comonomer comprising 1-butene, 1-hexene, 1-octene, or a mixture thereof;
the polymerization reactor system comprises a loop slurry reactor; and
the polymerization conditions comprise a polymerization temperature in a range from about 65° C. to about 110° C.

7. The process of claim 1, wherein the olefin polymer is an ethylene polymer characterized by:
a ratio of Mw/Mn in a range from about 4 to about 10;
a ratio of HLMI/MI in a range from about 15 to about 75; and
a density in a range from about 0.90 to about 0.96 g/cm³.

8. The process of claim 1, wherein the half-metallocene titanium compound having formula (I) has the structure of formula (III):

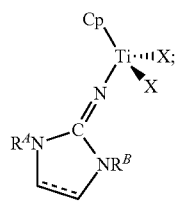

(III)

wherein:
Cp is a cyclopentadienyl, indenyl, or fluorenyl group;
each X independently is a monoanionic ligand; and
$R^A$ and $R^B$ independently are H or a halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group.

9. The process of claim 8, wherein, in formula (III):
Cp is a substituted or unsubstituted cyclopentadienyl or indenyl group;
each X independently is a halide or $C_1$ to $C_{18}$ hydrocarbyl group; and
$R^A$ and $R^B$ independently are H or a $C_1$ to $C_{18}$ hydrocarbyl group.

10. The process of claim 9, wherein:
$R^A$ and $R^B$ independently are a $C_1$ to $C_{12}$ alkyl group; and
the heterocyclic carbene group is unsaturated.

11. The process of claim 1, wherein the olefin polymer is an ethylene/α-olefin copolymer characterized by:
a ratio of Mw/Mn in a range from about 5 to about 9;
a ratio of HLMI/MI in a range from about 25 to about 55;
a density in a range from about 0.92 to about 0.95 g/cm³; and
less than or equal to about 0.003 long chain branches (LCB) per 1000 total carbon atoms.

12. The process of claim 1, wherein:
the olefin polymer has an increase in melt index of at least about 1 g/10 min, based on an increase in hydrogen:monomer weight ratio from 0 to 150 ppmw; and
the olefin polymer has a decrease in density of at least about 0.01 g/cm³, based on an increase in comonomer:monomer molar ratio from 0 to 0.0176:1.

13. The process of claim 1, wherein an organozinc compound is added to the polymerization reactor system, and the addition of the organozinc compound reduces the Mw/Mn of the olefin polymer and/or reduces the z-average molecular weight (Mz) of the olefin polymer.

14. The process of claim 1, wherein the half-metallocene titanium compound has any one of the following formulas:

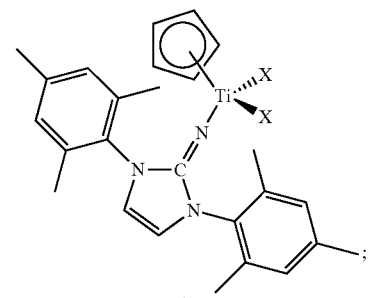

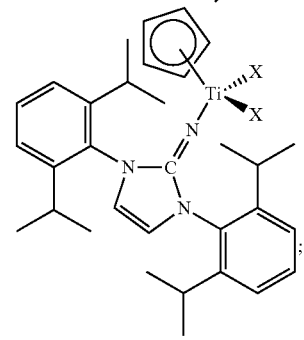

-continued

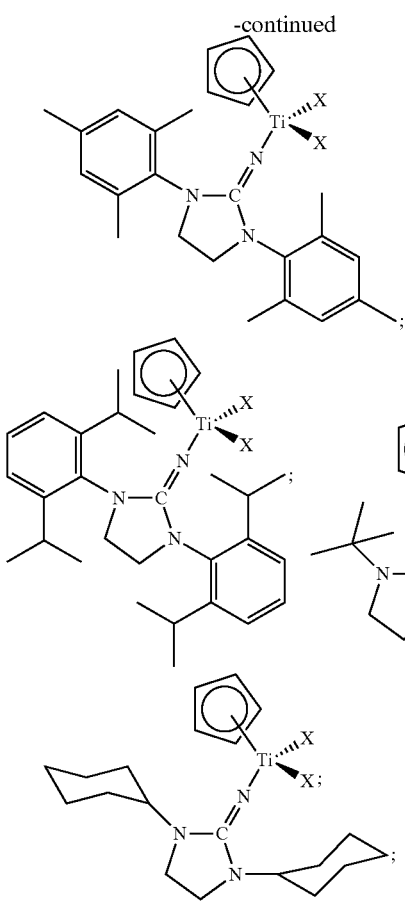

wherein each X independently is a monoanionic ligand.

15. The process of claim 14, wherein each X independently is a halide or $C_1$ to $C_{18}$ hydrocarbyl group.

16. The process of claim 14, wherein each X is Cl.

17. The process of claim 1, wherein the half-metallocene titanium compound comprises:

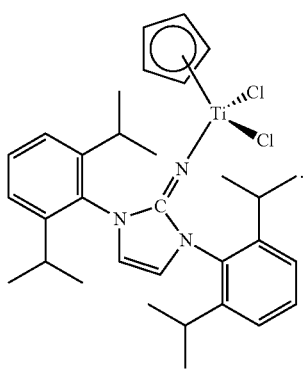

18. The process of claim 1, wherein the catalyst composition further comprises:
an unbridged zirconium based metallocene compound with a cyclopentadienyl group and an indenyl group; or
a bridged zirconium or hafnium based metallocene compound with a cyclopentadienyl group and a fluorenyl group.

19. An olefin polymerization process, the process comprising:
contacting a catalyst composition with an olefin monomer and an optional olefin comonomer in a polymerization reactor system under polymerization conditions to produce an olefin polymer, wherein the catalyst composition comprises:
(i) a half-metallocene titanium compound;
(ii) an activator-support comprising a solid oxide treated with an electron-withdrawing anion; and
(iii) an optional co-catalyst;
wherein the half-metallocene titanium compound has the formula:

wherein:
Cp is a cyclopentadienyl, indenyl, or fluorenyl group;
each X independently is a monoanionic ligand; and
L is a iminoimidazolidide ligand; and
wherein the olefin polymer has an increase in melt index of at least about 1 g/10 min, based on an increase in hydrogen:monomer weight ratio from 0 to 150 ppmw.

20. The process of claim 19, wherein the half-metallocene titanium compound has any one of the following formulas:

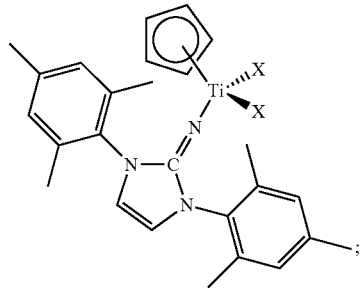

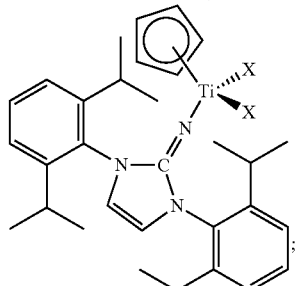

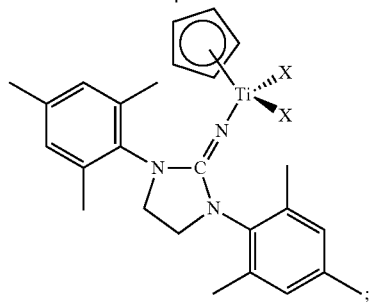

-continued

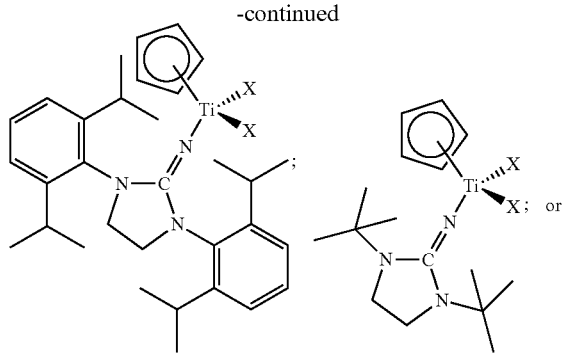

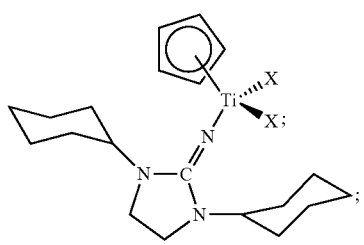

wherein each X independently is a halide or $C_1$ to $C_{18}$ hydrocarbyl group.

21. The process of claim 19, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

22. The process of claim 19, wherein the olefin polymer is an ethylene polymer characterized by:

a ratio of Mw/Mn in a range from about 5 to about 9;

a ratio of HLMI/MI in a range from about 25 to about 55; and a density in a range from about 0.92 to about 0.95 g/cm³.

* * * * *